US009268933B2

(12) United States Patent
Stecher

(10) Patent No.: US 9,268,933 B2
(45) Date of Patent: Feb. 23, 2016

(54) PRIVACY BROKER

(75) Inventor: Martin Stecher, Paderborn (DE)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/591,497

(22) Filed: Aug. 22, 2012

(65) Prior Publication Data

US 2014/0059658 A1    Feb. 27, 2014

(51) Int. Cl.
*G06F 7/04* (2006.01)
*G06F 21/45* (2013.01)
*H04L 29/06* (2006.01)
*G06Q 30/06* (2012.01)

(52) U.S. Cl.
CPC ............... *G06F 21/45* (2013.01); *G06Q 30/06* (2013.01); *H04L 63/0421* (2013.01); *H04L 2463/102* (2013.01)

(58) Field of Classification Search
CPC ..... G06F 21/45; G06Q 30/06; H04L 63/0421
See application file for complete search history.

(56) References Cited

U.S. PATENT DOCUMENTS

| | | | |
|---|---|---|---|
| 5,420,926 A | 5/1995 | Low et al. | |
| 5,557,518 A | 9/1996 | Rosen | |
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,184,811 B1 | 5/2012 | Patten et al. | |
| 8,234,698 B2 * | 7/2012 | Lee et al. ........................... | 726/6 |
| 2001/0029496 A1 | 10/2001 | Otto et al. | |
| 2001/0037209 A1 | 11/2001 | Tarbutton et al. | |
| 2003/0126094 A1 | 7/2003 | Fisher et al. | |
| 2003/0163733 A1 * | 8/2003 | Barriga-Caceres et al. .. | 713/201 |
| 2003/0195857 A1 | 10/2003 | Acquisti | |
| 2005/0108575 A1 * | 5/2005 | Yung .............................. | 713/201 |
| 2005/0204141 A1 * | 9/2005 | Sayers et al. ................... | 713/181 |
| 2006/0136990 A1 * | 6/2006 | Hinton et al. ...................... | 726/2 |
| 2006/0155993 A1 * | 7/2006 | Busboon ........................ | 713/169 |
| 2006/0288230 A1 * | 12/2006 | Crall et al. ..................... | 713/183 |
| 2007/0226152 A1 | 9/2007 | Jones | |
| 2008/0183590 A1 | 7/2008 | Drudis et al. | |
| 2009/0158392 A1 * | 6/2009 | Hughes et al. .................... | 726/3 |
| 2009/0205032 A1 * | 8/2009 | Hinton et al. ...................... | 726/7 |
| 2010/0063897 A1 | 3/2010 | Sonderegger et al. | |
| 2010/0094727 A1 | 4/2010 | Shapiro | |

(Continued)

FOREIGN PATENT DOCUMENTS

WO       WO 0019652 A1    4/2000

OTHER PUBLICATIONS

Network for Good—Donor Help—Retrieved in Jan. 2012—http://www1.networkforgood.org/donorhelp, 4 pages.

*Primary Examiner* — Techane Gergiso
(74) *Attorney, Agent, or Firm* — Patent Capital Group

(57) ABSTRACT

A brokered authentication request is received corresponding to an interaction between a particular user and a particular online entity. An identity provider corresponding to the particular user is identified that stores user data identifying the particular user. Confirmation is received that the identity provider has authenticated the particular user to a user profile maintained by the identity provider and a unique persistent user identifier is generated for the particular user that is unique within a system to a pairing of the first user with the first entity. The user identifier is caused to be communicated to the first entity for authenticating the first user in interactions with the first entity.

25 Claims, 16 Drawing Sheets

(56) References Cited

U.S. PATENT DOCUMENTS

| | | |
|---|---|---|
| 2010/0146603 A1 | 6/2010 | Lee et al. |
| 2011/0119154 A1* | 5/2011 | Lombardi .................. 705/26.41 |
| 2011/0265172 A1* | 10/2011 | Sharma et al. .................... 726/8 |
| 2011/0289573 A1* | 11/2011 | Seidl et al. ........................ 726/7 |
| 2011/0314532 A1* | 12/2011 | Austin et al. ...................... 726/8 |
| 2011/0314533 A1* | 12/2011 | Austin et al. ...................... 726/9 |
| 2012/0042042 A1* | 2/2012 | Winkler et al. ............... 709/217 |
| 2012/0158593 A1 | 6/2012 | Garfinkle et al. |
| 2012/0221421 A1 | 8/2012 | Hammad |
| 2013/0080336 A1 | 3/2013 | Van Wie et al. |
| 2014/0040134 A1 | 2/2014 | Ciurea |
| 2014/0058945 A1 | 2/2014 | Stecher |
| 2014/0059693 A1 | 2/2014 | Stecher |
| 2014/0372319 A1 | 12/2014 | Wolovitz |

\* cited by examiner

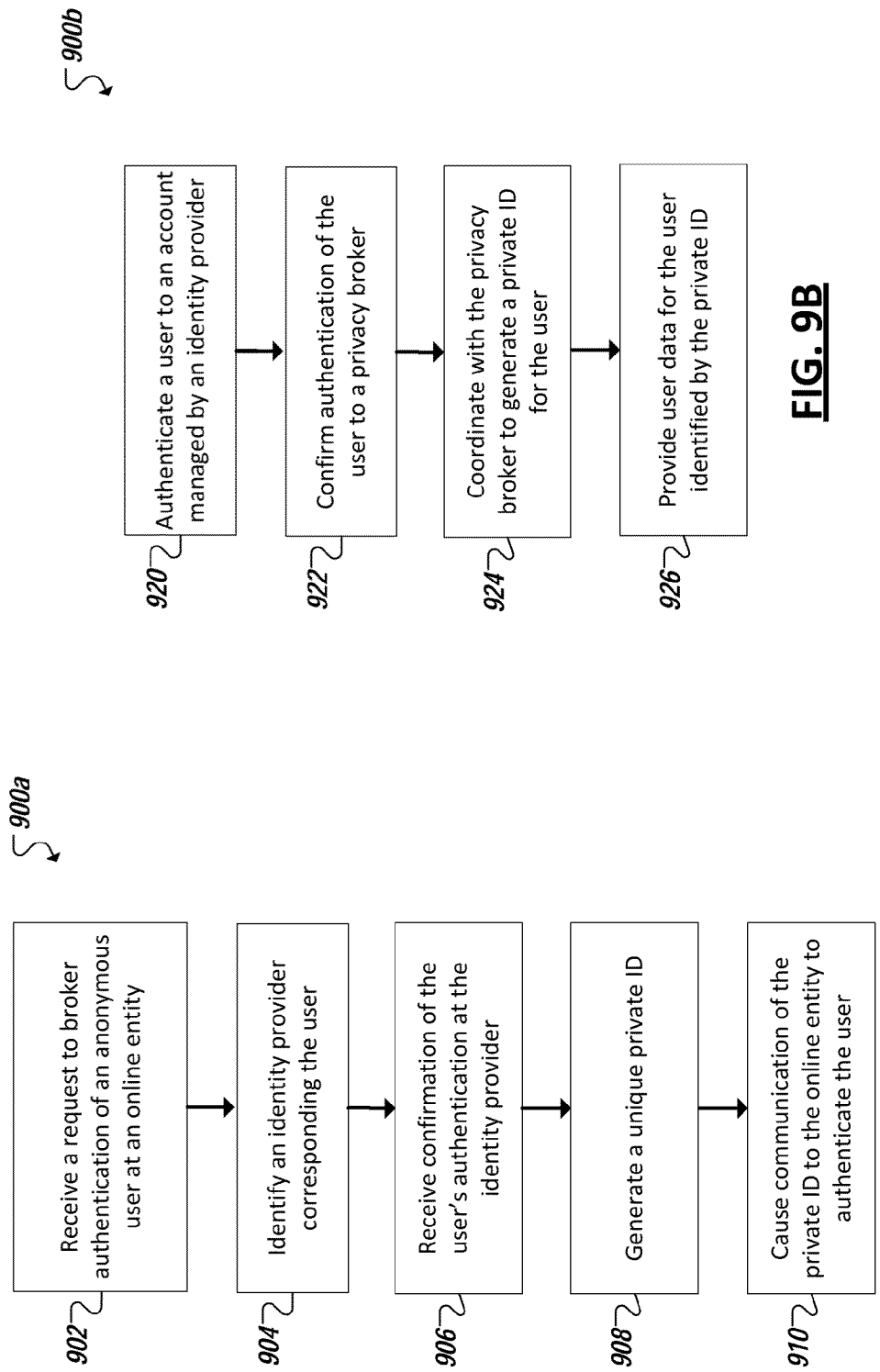

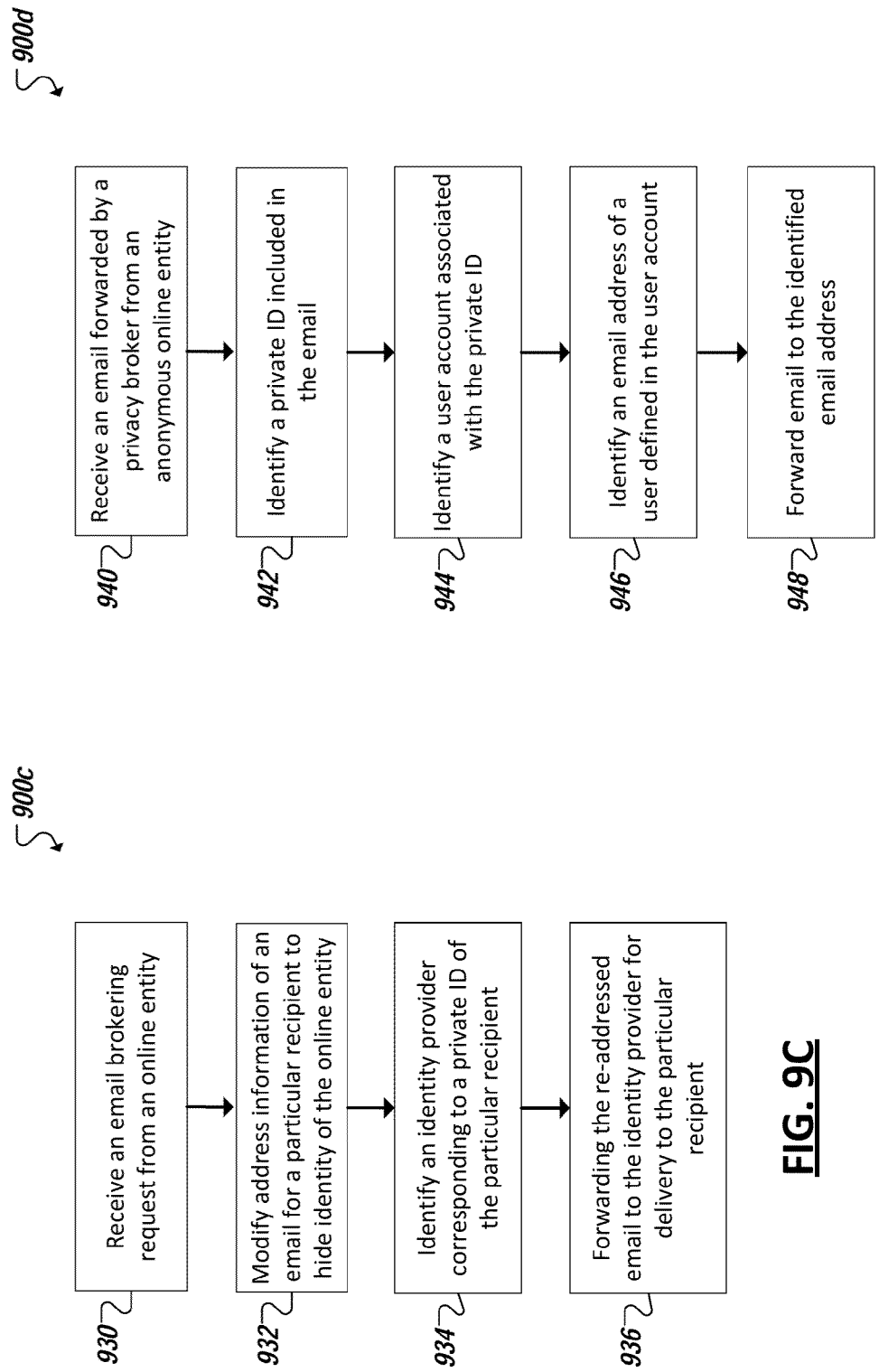

PRIVACY BROKER

TECHNICAL FIELD

This disclosure relates in general to the field of computer security and, more particularly, to user data privacy management.

BACKGROUND

The Internet has enabled interconnection of different computer networks all over the world. Additionally, a constantly evolving array of applications and services have developed using these networks, in some cases, developing entire industries, including electronic mail services, ecommerce, social media, gaming, online payment systems, etc. Online services can also allow for highly-customized user experiences. Accordingly, hosts of applications and services maintain user account data storing a variety of information describing attributes of the user, including sensitive personal attributes such as users' addresses, government-issued identifiers (such as Social Security numbers), birthdates, bank account information, credit card information, credit history, etc. Entrusting such information across a variety of widely-distributed entities and their sensitivity makes it more difficult for users to control such information and protect against its undesired dissemination and use. Additionally, as users maintain relationships with a variety of different services, keeping their personal information up to date and consistent across multiple user accounts can be difficult. Moreover, users sometime manage multiple different usernames and passwords, sometimes based on varying username and password schemes of the disparate hosts, further complicating account management.

Some online entities have attempted to develop solutions to consolidate management of user information and passwords. For instance, online "passport" systems and services have been developed, such as Microsoft™ Account, OpenID™, OAuth™, Google™ ID, among others. In some instances, the providers of such passport and single sign-on systems can also be content and/or service providers, both providing services based on user profiles as well as providing portals for managing a user's multiple accounts and profile.

BRIEF DESCRIPTION OF THE DRAWINGS

FIGS. 9A-9H are simplified flowcharts illustrating example techniques using a privacy broker in accordance with at least some embodiments.

Like reference numbers and designations in the various drawings indicate like elements.

DETAILED DESCRIPTION OF EXAMPLE EMBODIMENTS

Overview

Figure 1:
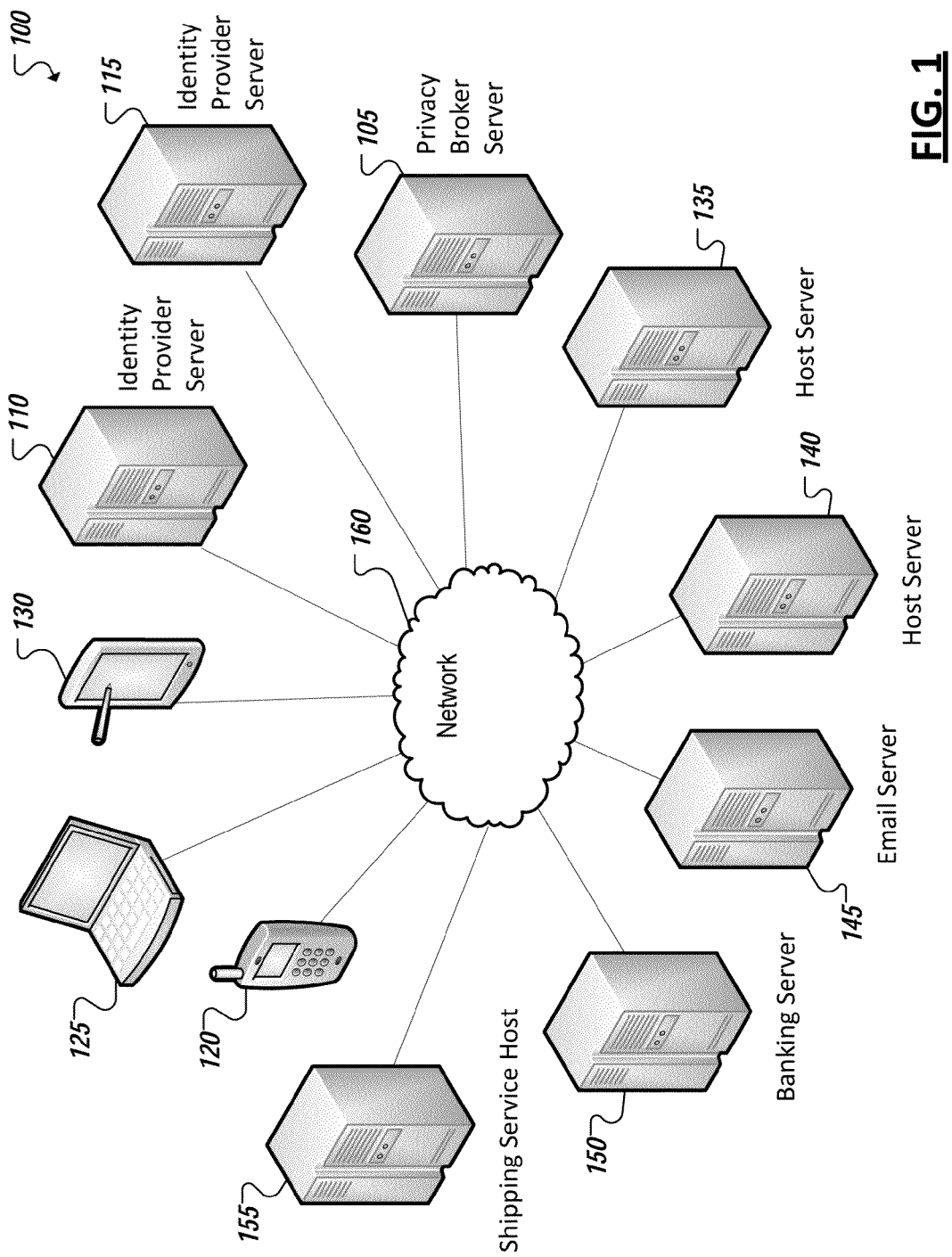
FIG. 1 is a simplified schematic diagram of an example computing system including a privacy broker and identity provider in accordance with at least one embodiment.

In general, one aspect of the subject matter described in this specification can be embodied in methods that include the actions of receiving a brokered authentication request corresponding to an interaction between a first user and a first online entity. An identity provider corresponding to the first user can be identified that stores user data identifying the first user. Confirmation can be received that the identity provider authenticated the first user to a user profile maintained by the identity provider and a unique persistent user identifier can be generated for the first user that is unique within a system to a pairing of the first user with the first entity. The user identifier can be communicated to the first entity for authenticating the first user in interactions with the first entity.

Another general aspect of the subject matter described in this specification can be embodied in systems that include at least one processor device, at least one memory element, and a privacy broker. The privacy broker, when executed by the at least one processor device, can receive a brokered authentication request corresponding to an interaction between a first user and a first online entity and identify an identity provider corresponding to the first user that stores user data identifying the first user. The privacy broker can further be adapted to receive confirmation that the identity provider authenticated the first user to a user profile maintained by the identity provide, generate a unique persistent user identifier for the first user, and cause the user identifier to be communicated to the first entity for authenticating the first user in interactions with the first entity. The user identifier can be unique, within a system, to a pairing of the first user with the first entity.

These and other embodiments can each optionally include one or more of the following features. Brokered authentication requests can be received at a privacy broker, the identity of the first user can be unknown to the privacy broker. The broker authentication request can be received in response to a redirect of the first user from the first online entity to a privacy broker. The identity of the first entity interacted with by the first entity can be unknown to the identity provider. The identity provider can be selected by the first user from a plurality of identity providers. In some instances, the identity provider can be identified in a redirect of the first user from the first online entity to the privacy broker. A redirect can be sent to the first user to redirect the first user to the identity provider based on the identification of the identity provider. The brokered authentication request can include a request for user information of the first user, and the request for user information can be communicated to the identity provider. User information returned by the identity provider in response to the request for user information can mask the identity of the first user and be communicated to the first entity. The user information can include, for example, age information of the first user, location information of the first user, reputation information for the first user, nationality of the first user, gender information of the first user, etc. The user information returned by the identity provider can indicate whether a particular attribute of the first user satisfies a particular condition of the first entity for the particular attribute while withholding the actual values of the particular attribute of the first user. The first user can be authenticated anonymously at the first entity using the privacy broker. The identity provider can be adapted to maintain user information for a plurality of users including the first user, cooperatively generate user identifiers for the plurality of users with the privacy broker, and respond to requests for user information of the plurality of users by referencing the users by the respective user identifiers of the users. The privacy broker can maintain host data corresponding to a plurality of online entities including the first entity, the identities of the entities known to the privacy broker. Identity of the first user can be hidden from the privacy broker.

Further, these and other embodiments can also each optionally include one or more of the following features. The user identifier can be generated jointly by a privacy broker and an identity provider. The user identifier can be generated from a first input from the privacy broker and a second input from the identity provider, where the first input value is unknown to the identity provider and the second input value is unknown to the privacy broker. The first input value can identify the first entity and the second input value can identify the first user and each of the first and second inputs can be hashed values. The hashed first and second input can be exchanged between the privacy broker and identity provider and a hash of the hashed first and second inputs can be generated. Confirmation of the first user's authentication to the user profile can be received from the first user or the identity provider. Feedback can be received regarding the first entity from the first user referencing the user identifier. Feedback can also be received regarding the first user from the first entity and communicated to the identity provider, referencing the user identifier. In some instances, another brokered authentication request can be received corresponding to an interaction between a second user and the first entity and a second unique persistent user identifier can be generated for the second user, the second user identifier unique, within the system, to a pairing of the second user with the first entity. The second user identifier can be communication to the first entity for authenticating the second user in interactions with the first entity. In other instances, another brokered authentication request can be received corresponding to an interaction between the first user and a second online entity and another unique persistent user identifier can be generated for the first user, the other user identifier unique, within the system, to a pairing of the first user with the second entity. The other user identifier can be communicated to the second entity for authenticating the first user in interactions with the second entity.

In general, another aspect of the subject matter described in this specification can be embodied in methods that include the actions of receiving a payment brokering request from a first entity corresponding to a particular payment requested of an anonymous user, the payment brokering request including banking information of the first entity. A payment partner can be identified that is associated with the anonymous user and it can be communicated to the payment partner that the particular payment from the anonymous user has been requested. Confirmation data can be received from the payment partner confirming that the particular payment was authorized by the anonymous user and that the payment partner will transfer funds to the broker banking system.

Another general aspect of the subject matter described in this specification can be embodied in systems that include at least one processor device, at least one memory element, and a privacy broker. The privacy broker, when executed by the at least one processor device, can receive payment brokering request from a first entity corresponding to a particular payment requested of an anonymous user, including banking information of the first entity, identify a payment partner associated with the anonymous user, and communicate to the payment partner that the particular payment from the anonymous user has been requested. In some instances, the privacy broker can further receive confirmation data from the payment partner confirming that the particular payment was authorized by the anonymous user and communicate the banking information of the first entity to a broker banking system for the broker banking system to forward the payment to the first entity according to the communicated banking information.

These and other embodiments can each optionally include one or more of the following features. The banking information of the first entity can be communicated to a broker banking system and receiving confirmation can be received from the broker banking system that the particular payment was forwarded through the broker banking system from the payment provider to the first entity. The identity of the anonymous user can be unknown to the first entity and a privacy broker that receives the payment brokering request. The identity of the anonymous user can be known to the payment partner. The payment brokering request can identify a unique, persistent user identifier, the user identifier unique, within a system, to a pairing of the anonymous user with the first entity. The payment partner can use the user identifier to identify that a particular user is the anonymous user. The user identifier can be generated jointly by a privacy broker and an identity provider, the identity provider storing user data for a plurality of users including the anonymous user. The payment provider can be the identity provider. The payment provider can cooperate with the privacy broker to generate the user identifier. The user identifier can be generated from a first input from the privacy broker and a second input from the identity provider, the first input value unknown to the identity provider and the second input value unknown to the privacy broker. The first input value can identify the first identity and the second input value can identify the first user. The payment brokering request can include the amount of the payment.

In another general aspect, the subject matter described in this specification can be embodied in methods that include the actions of receiving a payment request forwarded by a privacy broker from a first anonymous entity, the payment request requesting payment by a particular user to the first entity and including a user identifier paired to the particular user and the first anonymous entity. The particular user (such as a returning user) can be identified from the user identifier, the payment request can be communicated to the particular user, and authorization for payment of the payment request can be received from the particular user. Confirmation of the authorization of the payment can be communicated to the privacy broker and payment can be transferred to a brokering financial institution associated with the privacy broker, the transfer identifying the user identifier and the brokering financial institution forwarding the particular payment to a financial institution associated with the first anonymous entity.

These and other embodiments can each optionally include one or more of the following features. The particular user can be authenticated at the payment provider. The payment provider can cooperate with the privacy broker to generate the user identifier. Identity of the first anonymous entity can be known to the privacy broker. The user identifier can be unique, within a system, to a pairing of the particular user with the anonymous entity. Information identifying the particular user can be withheld in the transfer of the payment to the brokering financial institution.

In general, another aspect of the subject matter described in this specification can be embodied in methods that include the actions of receiving a request for a brokered shipment from a particular entity to an anonymous user. A shipping identifier can be obtained from a shipping entity, on behalf of the particular entity, for the shipment from the particular entity to the anonymous user. The shipping identifier can be communicated to the particular entity and the shipping identifier can be associated with a unique user identifier, the user identifier unique, within a system, to a pairing of the anonymous user with the particular entity. Address information of the anonymous user can be unknown to the particular entity, and address information can be obtained from the shipping entity for the anonymous user.

Another general aspect of the subject matter described in this specification can be embodied in systems that include at least one processor device, at least one memory element, and a privacy broker. The privacy broker, when executed by the at least one processor device, can receive a request for a brokered shipment from a particular entity to an anonymous user, obtain a shipping identifier from a shipping entity, on behalf of the particular entity, for the shipment from the particular entity to the anonymous user, and communicate the shipping identifier to the particular entity. The privacy broker can be further adapted to associate the shipping identifier with a unique user identifier, the user identifier unique, within a system, to a pairing of the anonymous user with the particular entity, where address information of the anonymous user is unknown to the particular entity, and address information is obtained from the shipping entity for the anonymous user. The privacy broker can be further adapted to generate the user identifier for the anonymous user.

These and other embodiments can each optionally include one or more of the following features. The user identifier can be generated, for instance, jointly by a privacy broker and an identity provider. The user identifier can be generated from a first input from the privacy broker and a second input from the identity provider, the first input value unknown to the identity provider and the second input value unknown to the privacy broker. The first input value can identify the particular entity and the second input value can identify the anonymous user. The identity of the anonymous user can be unknown to the particular entity. The request can identify attributes of the shipment including, for example, package weight, package size, package contents, departing location, and destination region. Obtaining the shipping identifier from the shipping entity can include arranging purchase of the shipment on behalf of the particular entity. The identity of the particular entity can be anonymous to the shipping entity and arranging the purchase can preserve anonymity of the particular entity. The shipment address can be provided by the anonymous user to the shipping entity referencing the shipping identifier. The shipment address can alternatively be provided to the shipping entity by an identity provider system associated with the anonymous user and referencing the shipping identifier.

In another general aspect, the subject matter described in this specification can be embodied in methods that include the actions of receiving a request for a shipment identifier from a privacy broker on behalf of an anonymous first entity for a particular shipment from the first entity to a particular user. The shipment identifier can be generated and communicated to the particular user, the communicated shipment identifier excluding address information of the particular user. Address information of the particular user can be received from a second entity and applied to the shipment identifier in connection with delivery of the shipment to the particular user.

These and other embodiments can each optionally include one or more of the following features. The address information can be withheld from the first entity as well as the privacy broker. The request can identify attributes of the particular shipment, and a shipping cost for the particular shipment can be calculated based on the identified attributes. The second entity can be, in some instances, the particular user, and in other instances, an identity provider maintaining user information for a plurality of users including the particular user. The identity provider can identify the address information of the particular user based on a user identifier for the particular user, the user identifier unique, within a system, to a pairing of the particular user with the first entity. The user identifier can be jointly generated between the privacy broker and the identity provider.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example computing system 100 including a privacy broker server 105 and one or more identity provider servers 110, 115. The privacy broker server 105 can serve as an intermediary to shield and filter user information maintained at the identity provider servers from being associated with activities of one or more users, using user client devices 120, 125, 130, for example, to interact and transact with a variety of websites, web applications, and online services hosted by host servers 135, 140, 145, 150, 155 on a network 160, such as the Internet. Host servers can include, among other examples, host servers (e.g., 135, 140) hosting a wide variety of websites, services, and applications, including subscription news, music, video, or other media sites, social networking sites, ecommerce sites, enterprise software, etc. One or more email servers 145 can exist that send and/or receive email communications to/from one or more users associated with user profiles maintained by identity providers (e.g., 110, 115). Online banking servers (e.g., 150) can also be provided that can be associated with or managed by financial institutions of online payment providers, credit providers, ecommerce merchants, and/or users connected to the system 100. Further, in connection with ecommerce applications, such as online storefronts maintained at other host servers (e.g., 135, 140), shipping enterprises can maintain shipping service host servers (e.g., 155) adapted to communicate with and facilitate shipping of goods purchased through ecommerce as well as provide services to shipment senders and recipients in tracking, confirming, and facilitating shipping and returns between the senders and recipients, among other examples.

In general, "servers," "clients," "computing devices," "hosts," "endpoint devices," "client devices," "network elements," "hosts," and "systems," etc., including devices in example computing environment 100 (e.g., 105, 110, 115, 120, 125, 130, 135, 140, 145, 150, 155, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 130, 135, 140, 145, 150, 155, etc.) can each include one or more processors, computer-readable memory, and one or more interfaces, among other features and hardware. Servers can include any suitable software component or module, or computing device(s) capable of hosting and/or serving software applications and services (e.g., privacy broker server 105, identity provider servers 110, 115, host servers 135, 140, 145, 150, 155, etc.), including distributed, enterprise, or cloud-based software applications, data, and services. For instance, in some implementations, a privacy broker server 105 and/or identity provider servers 110, 115, or other component or sub-system of computing system 100 can be a cloud-implemented system configured to remotely host, serve, or otherwise manage data, software services and applications interfacing, coordinating with, dependent on, or used by other services and devices in system 100. In some instances, a server, system, subsystem, or computing device can be implemented as some combination of devices that can be hosted on a common computing system, server, server pool, or cloud computing environment and share computing resources, including shared memory, processors, and interfaces.

Host, endpoint, client, or client computing devices (e.g., 120, 125, 130, etc.) can include traditional and mobile computing devices, including personal computers, laptop computers, tablet computers, smartphones, personal digital assistants, feature phones, handheld video game consoles, notebook computers, desktop computers, internet-enabled televisions, and other devices designed to interface with human users and capable of communicating with other devices over one or more networks (e.g., 160). Such devices can also include computer-assisted, or "smart," appliances, such as household and industrial devices and machines that include computer processors and/or one or more software programs executed by the computer processors that control, monitor, assist, supplement, or otherwise enhance the functionality of the devices.

Attributes of host server devices, user client devices, network elements (e.g., network 160), and computing devices generally can vary widely from device to device, including the respective operating systems and collections of applications, security software and tools, and other software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices. A similarly diverse array of hardware can be utilized and included in host computing devices, including a variety of different chip sets, ports, display devices, network interface hardware, input devices, peripherals, and other hardware-based components. Graphical display devices and user interfaces, supported by computer processors of the host devices, can further allow a user to view and interact with graphical user interfaces of applications and other programs provided in system 100, including user interfaces and graphical representations of programs interacting with applications hosted within the host devices, as well as graphical user interfaces associated with remote servers, etc. Moreover, while system devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

User profiles and the use of user information have become ubiquitous among modern Internet applications and services. User information can be used to tailor content, services, and advertising to the particular user, thereby enhancing the services offered to users. User information can also be shared in connection with the delivery of goods and services in ecommerce. For instance, bank account information, credit card information, addresses, and user names can be shared in connection with an ordered good or service offered by vendors online. Authentication information can also be shared online. It is not uncommon for an individual user to maintain several user profiles as well as multiple different usernames, passwords, certificates, cookies, and other authentication and identification information across multiple sites and services. The sharing of personal information across such a wide variety of sites and vendors can increase the exposure of users to breeches and misuse of the user's private information. Further, management of the various different user accounts can become increasingly complex and inconvenient as users struggle to remember and track the various password and usernames schemes of the various services and subscriptions they use.

While some services have been developed that attempt to unify a user's various accounts, passwords, and personal data in a centralized account, such services suffer some of the same disadvantages of the prior art and introduce still additional issues. For example, while a private enterprise can provide single sign-on and/or passport-type services, entrusting such information to private (or even public) enterprises can cause such enterprises to have an even firmer grasp on the private information and personal data of the user. In such instances, while it may be simpler to track, update, and maintain personal accounts and information at a single, central source, the user is particularly vulnerable to abuses by the controller of that central source acting as the guardian and repository of so much of the user's personal information. Such abuses and threats can include for-profit sharing and use of the user's data by the controller of the central source, security breaches at the central source (e.g., from hackers, etc.), among other threats. Further, a single sign-on can enable the controller of the single sign-on account to potentially track the types of sites the user visits, when they visit them, and what activities and transactions the user visits online, thereby increasing the amount of personal information associated with, and potentially threatened, through the use of such traditional identification providers, single sign-on services, etc.

Figure 2:
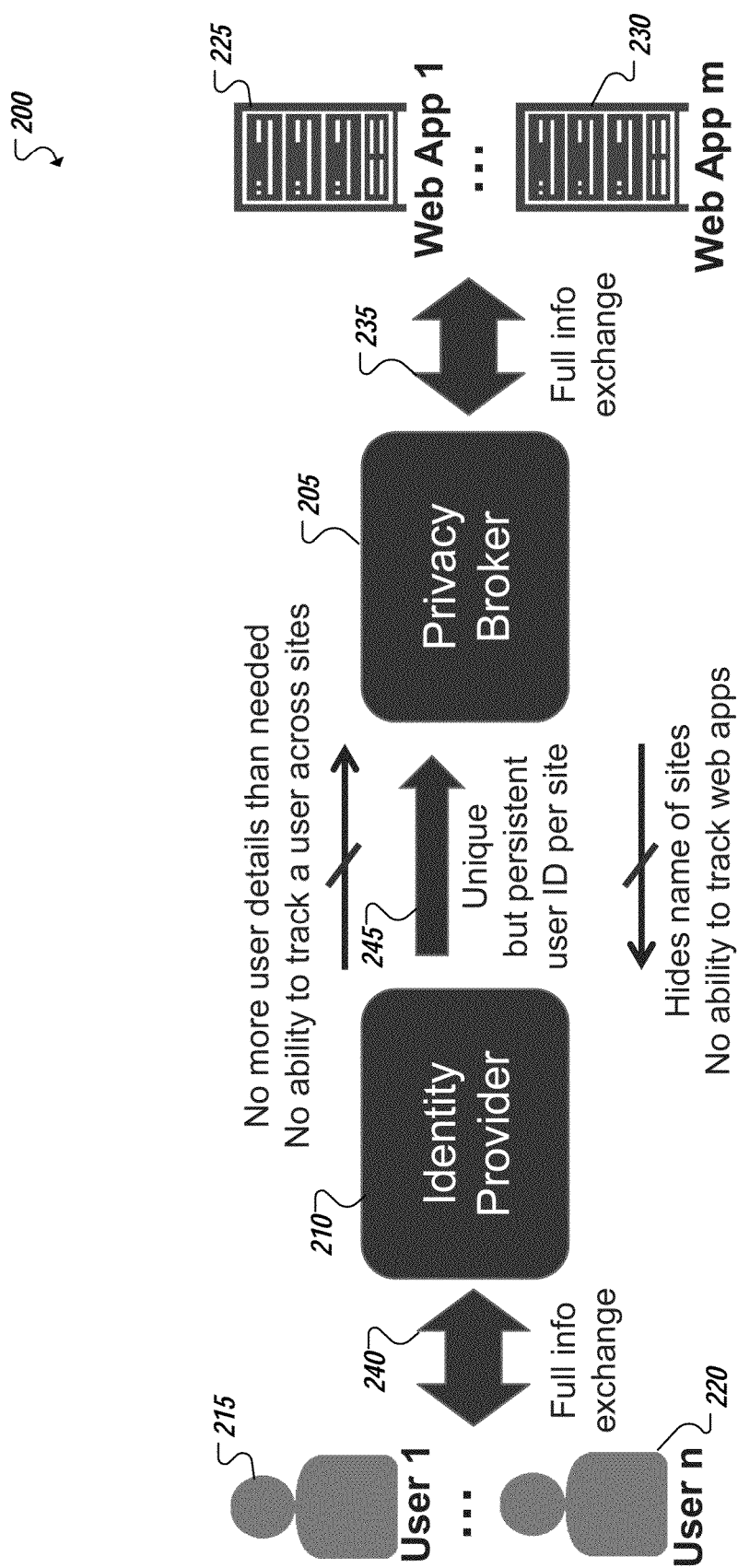
FIG. 2 is a simplified flow diagram illustrating example interaction between a privacy broker and identity provider in accordance with at least one embodiment.

Computing systems, such as computing system 100 including a privacy broker 105, can resolve many of the issues pertaining to user profile maintenance and privacy discussed above, for example, among other issues and advantages. Turning to FIG. 2, a simplified flow diagram 200 is shown illustrating principles of an example privacy broker 205 in connection with one or more identity providers (e.g., 210). The identity provider 210 can maintain personal information of one or more users 215, 220 that can be used in connection with personalized transactions between the users and web applications (e.g., 225, 230). The privacy broker 205 can be positioned between the identity provider 210 and the various web applications 225, 230 and can be used to restrict access to user information by the web applications while further protecting users by hiding the identity of the websites and applications (e.g., 225, 230) frequented by the users 215, 220. For instance, in one implementation, users 215, 220 can entrust an identity provider 210 with full access to user information (e.g., 240) in connection with an identity account of the user (e.g., 215, 220). On the other side of transactions between users (e.g., 215, 220) and applications (e.g., 225, 230), privacy broker 205 can identify that transactions between anonymous users and applications (e.g., 225, 230) take place, with the privacy broker 205 enjoying access to information (e.g., 235) describing the web application including information identifying the particular application, type of transaction, web application vendor, etc.

In some examples, a privacy broker 205 can negotiate a unique user identifier (ID) (also referred to herein as a "private ID") (e.g., 245) for a particular user (e.g., 215) in pairings of the particular user with a particular web application (or service, vendor, or other online entity, etc., referred to collectively as web application, in some instances) (e.g., 225). The unique user ID 245 can hide the true identity of the user 215 from the web application 225 and the privacy broker 205 while hiding the identity of the web application from the identity provider 210. Requests for personal data of the user 215 from the web application 225 can be forwarded to the identity provider through the privacy broker and tagged with the unique user ID, or private ID 245. The privacy broker 205 can identify that the private ID 245 corresponds to a particular web application and a user managed by one or more identity providers (e.g., 210) and cause the request to be forwarded, or redirected, to the appropriate identity provider 210. The identity provider 210 can identify the actual user profile and incorporated user information corresponding to the private ID, although the identity provider 210 may not be capable of identifying the precise website, application, or service to which the request applies and with which the user has interacted. Further, such private IDs can be unique to the pairing of the particular user with the particular web application. As users have relationships with other web applications compatible with or otherwise making use of the services of a privacy broker 205, additional unique private IDs can be generated for the user for each different web application (e.g., 230) with which the user 215 interacts or has an account, each private ID unique to the particular user-web application pairing. The individual web applications can then use their respective private ID for the particular user 215 to repeatedly identify the user (by the unique private ID) and offer customized services, content, and experiences to the user without the user forfeiting anonymity with regard to more sensitive personal details.

Figure 3:
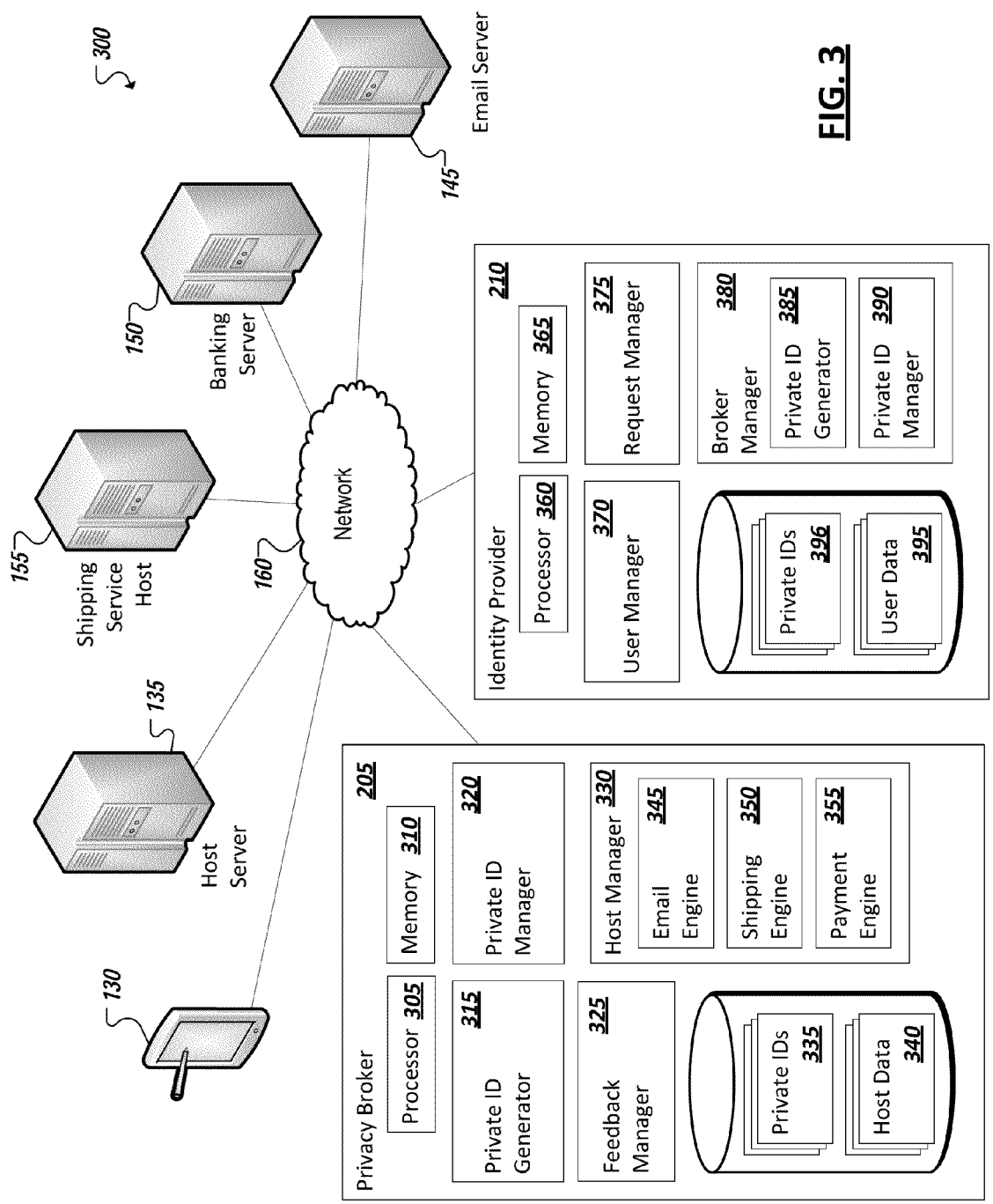
FIG. 3 is a simplified block diagram of an example computing system including an example privacy broker and an example identity provider in accordance with at least one embodiment.

Turning to FIG. 3, a simplified block diagram 300 is shown of an example implementation of a privacy broker 205 in use within a system including potentially multiple identity providers (e.g., 210) hosting personal account information and other user data (e.g., 395) for a plurality of users (using user devices (e.g., 125, 130, etc.)), in connection with the users' respective interactions and subscriptions to multiple different web-based sites, applications, and services (e.g., as hosted by host servers 135, 145, 150, 155, etc.). The example system in FIG. 3, through the privacy broker 205 and identity provider 210 can implement features and functionality similar to those described in the example of FIG. 2, including the generation and use of unique private IDs.

An example privacy broker 205 can include one or more processors (e.g., 305) and one or more memory elements (e.g., 228), as well as components and entities such as a private ID generator 215, private ID manager 320, feedback manager 325, host manager 330, among potentially other modules and subsystems offering additional or alternative functionality. An example private ID generator 315 can provide functionality for communicating and cooperating with a particular identity provider 210 managing user data 395 of a particular user and generating a unique private ID paired to the particular user and a particular web application (or service, site, vendor, etc.). Such private IDs can be generated according to a variety of techniques, including techniques that utilize secret data from each the privacy broker 205 and identity provider 210 to generate the private ID. Indeed, in some instances, private ID generator 315 can include functionality that can be used to generate a private ID, in part, from the identity of the particular host embodied as the secret data of private ID generator 315 of the privacy broker in such examples. In still further examples, private ID generator 315 can include functionality for generating private IDs according to a joint hash algorithm discussed herein (e.g., in connection with FIG. 5A below).

A private ID generator 315 of a privacy broker 205 can be involved in the generation of multiple different private IDs 335 corresponding to multiple different combinations of different users and web applications, as well as private IDs 335 generated through cooperation with multiple different identity providers (e.g., 210). Private IDs 335 that have been generated using a privacy broker 205 can be maintained and managed by a private ID manager 320. In some instances, a private ID manager 320 can validate private IDs forwarded to the privacy broker either by users, identity providers, or host servers, check that the private IDs are known to or are otherwise associated with the privacy broker 205 and identify web applications mapped to the particular private ID. Indeed, host data 340 can be maintained by a privacy broker 205 describing attributes of hosts (e.g., 135, 145, 150, 155, etc.) for which private IDs have been generated and/or maintained by the privacy broker 325.

In some instances, a privacy broker 325 can serve as a collector and repository of anonymous feedback data received in connection with private transaction orchestrated through the use of private IDs 335 and a privacy broker 205. For instance, feedback can be received from an anonymous user regarding particular hosts interacted with by the anonymous user. A feedback manager 325 can bind the received feedback, based on an identified private ID of the anonymous user providing the feedback, to host data 340 of a web application corresponding to the private ID. Such feedback data can be used, for instance, in building reputation data for the particular web application. In addition to collecting feedback regarding web applications (or their hosts) in a private transaction, a feedback manager 325 can, in some instances, additionally be used to collect feedback data regarding the behavior of the anonymous user. Such feedback data can be communicated, for instance, to an identity provider (e.g., 210) identified (e.g., from the corresponding private ID of the anonymous user) for use in building a user reputation, among other uses and examples.

In some implementations, a privacy broker 205 can be provided that is capable of facilitating a variety of different types of private transactions involving a variety of different applications, sites, and services of the various hosts utilizing the services of the privacy broker 205. A host manager 330 can be used to manage the various private transaction types of the various hosts. For instance, in one example, a host manager 330 can include an email engine 345, shipping engine 350, and payment engine 355, among potentially others. An email engine 345 can manage private email transactions involving the sending of emails to an anonymous user facilitated through a privacy broker 205 and a generated private ID. A shipping engine 350 can be used to manage transactions involving the arrangement of shipments between a shipping entity and an anonymous user/recipient using privacy broker 205 and a generated private ID. Further, the example payment engine 355 can be used to arrange payment between an anonymous user and another entity, again through the privacy broker 205 and a generated private ID, among other examples.

An example identity provider 210 can be provided to store and manage personal account information, user data, passwords and other credentials, among other information for a plurality of users. An identity provider 210 can include one or more processors (e.g., 360) and one or more memory elements (e.g., 365), as well as components and entities such as a user manager 270, request manager 375, and broker manager 380, among potentially other modules and subsystems offering additional or alternative functionality. In some implementations, a user manager 370 can manage accounts of a plurality of different users, or subscribers to the identity provider 210. An identity provider (e.g., 210) can be one of a plurality of entities offering identity management solutions to users. The identity providers can, in some instances, offer a single-sign-in to users allowing them to maintain a single depository for their personal information governed by a single password, user account, etc. The identity provider 210 can then be used to log the user into various other sites, applications, and services (e.g., 135, 145, 150, 155), the identity provider offering the sites, applications, and services (e.g., 135, 145, 150, 155) at least a portion of the user's personal data in connection with the services provided by the host (e.g., 135, 145, 150, 155). In some implementations, an identity provider 210 can provide a single sign-on interface outside of cooperation with a privacy broker 205. In such instances, the identity provider can share the personal information of the user directly with the host of the website, application, or service (e.g., 135, 145, 150, 155), while in other instances, the identity provider can attempt to anonymize or otherwise mask more sensitive personal information shared with outside websites, applications, and services, for instance, through cooperation with a privacy broker 205. In such instances, however, while the identity provider would shield third party hosts from user data entrusted to the identity provider, the identity provider could track the activity of the user with regard to the types and frequency of different websites, applications, etc. the user browses or uses, jeopardizing the privacy of the user.

In one implementation of an identity provider, a user manager 370 can provide functionality for collecting and managing user data 395 associated with accounts of one or more users. Such user data 395 can be collected, for instance, from form GUIs filled out by the user, through information collected automatically by the identity provider 210 relating to the user and the user's online behavior, among other examples. User data 285 can further include usernames and passwords of the user that are used to authenticate the user at the identity provider and thereby also, in some examples, other sites, applications, and services hosted by third party hosts (e.g., 135, 145, 150, 155). When interfacing with a third-party host (e.g., 135, 145, 150, 155), particular information can be requested by the host (e.g., 135, 145, 150, 155) for use in anonymously authenticating the user at the host and serving a particular service, application, or website to the user (e.g., 130). For instance, information confirming the user's age, credit status, address, etc. can be shared with the host, among other information, including information identifying the user's preferences, hobbies, etc. A request manager 375 can be provided that is adapted to identify requests for personal information and respond to the requests by identifying particular portions of a user's account data (e.g., 395) and providing them to the requesting host. Additionally, a request manager 375 can also be responsible for furnishing data to a requesting host (e.g., 135, 145, 150, 155) confirming a user's authentication to the identity provider, such as in instances where single sign-on functionality allows for a user's authentication at the identity provider (e.g., 210) to be recognized as authenticating the user at the host (e.g., 135, 145, 150, 155) itself. In some instances, a request manager 375 can be adapted to limiting the amount of personal information shared in response to a host's request for user information. For instance, requests for personal information can pertain to age or geographical licensing restrictions, among other examples, and the request manager 375 can identify a minimum set of information to provide in satisfaction of the request. For instance, rather than divulging the actual geographical location of the user (e.g., street address, etc.), the request manager 375 can provide higher-level details to satisfy the request (e.g., zip code, country, etc.). Similarly, if a request from a host relates to verifying that the user is an adult or above a certain age, the request manager 375, rather than identifying the user's birthdate or actual age can respond with a binary yes/no response regarding whether the user's age is above/below a certain threshold, within a certain range, etc., among other examples.

User privacy can be additionally facilitated through transactions involving a privacy broker (e.g., 205). An identity provider 210 can include functionality for operating with and facilitating such privacy-broker-assisted transactions. For instance, in some implementations, an identity provider 210 can include a broker manager 380 that includes, in one example, a private ID generator 385 and private ID manager 390. A broker manager 380 can identify requests for user data and user authentication in connection with transactions managed by a privacy broker (e.g., 205). Further, in some systems, multiple privacy brokers may be provided through multiple different vendors, each with its own algorithms and functionality. Accordingly, broker manager 380 can identify the particular privacy broker involved in the transaction in order to determine how to interact with the particular privacy broker, as well as determine other attributes of the identified privacy broker, including the trustworthiness or reputation of the privacy broker, among other examples.

In some implementations, a broker manager 380 can include a private ID generator 385 used to generate a private ID in coordination with a privacy broker 205. In some instances, privacy broker 205 and identity provider 210 can jointly generate a private ID through exchanges of data and coordinated hashing or processing of the data, for instance, using respective private ID generators 315, 385. The privacy broker 205 and identity provider 210 can then store respective records of the generated private IDs 335, 396, the privacy broker 205 binding the generated private ID to the identity of a respective web application, corresponding vendor, etc., and the identity provider 210 binding the same private ID to the identity of a corresponding user account. Indeed, private IDs 396 can be associated with user data 395 of various user accounts managed by the identity provider 210 and can be used (e.g., by request manager) in identifying anonymous requests for user data associated with the private ID.

Figure 4A:
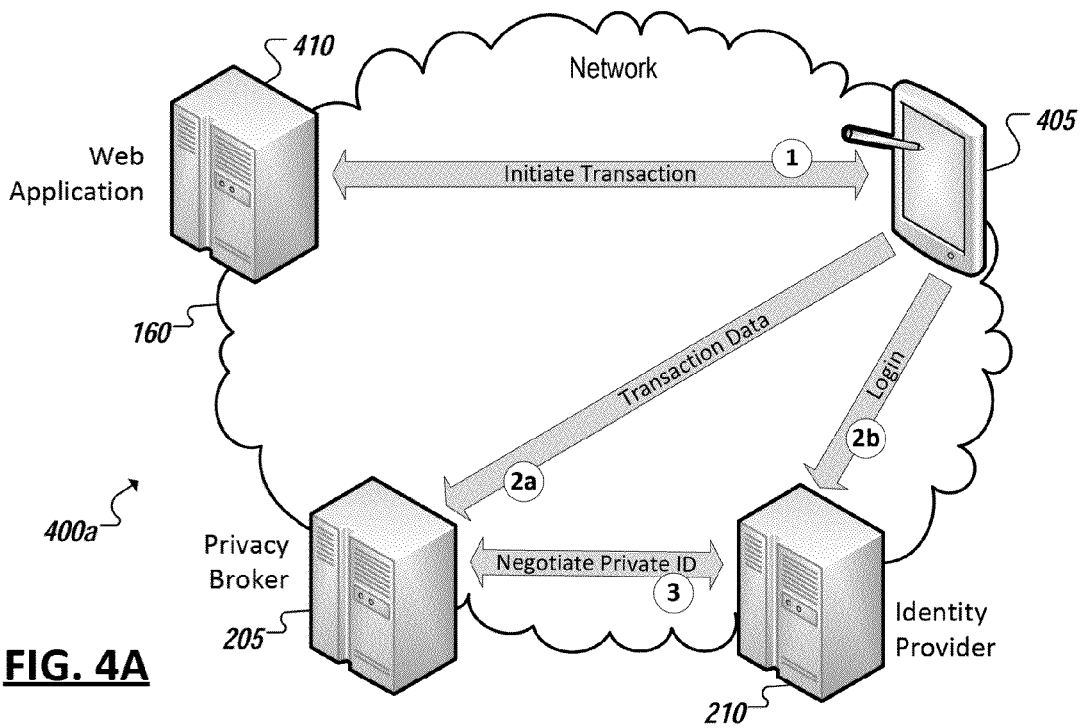
FIGS. 4A-4B are simplified flow diagrams illustrating example operations of a privacy broker in accordance with at least one embodiment.
Figure 4B:
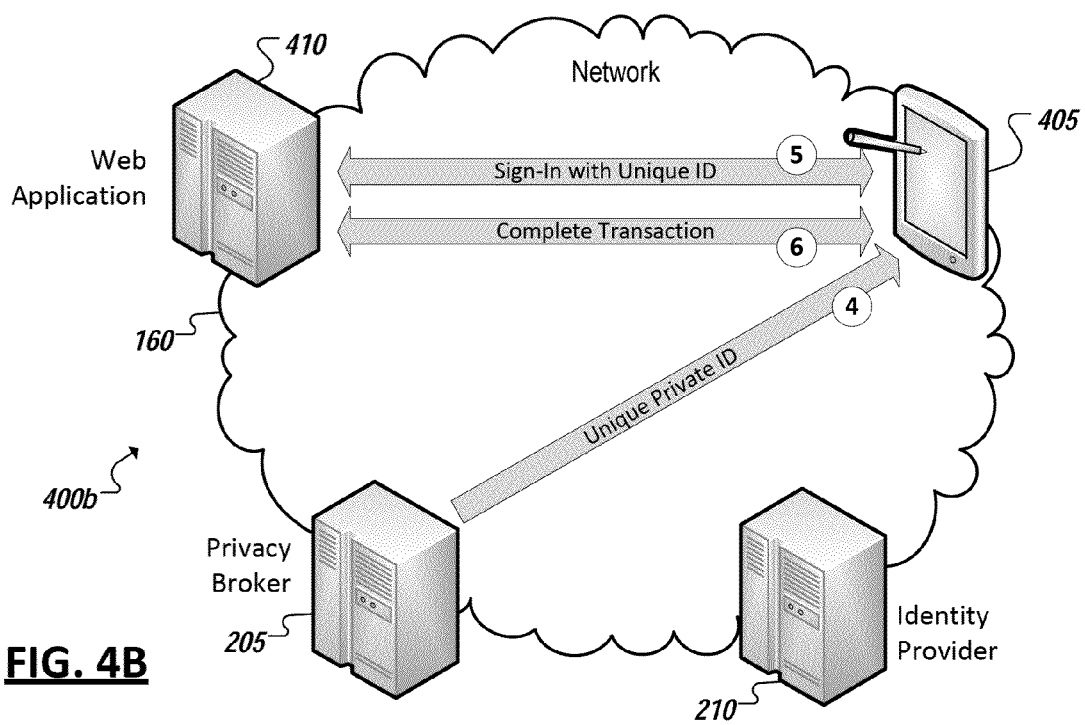

FIGS. 4A-4B show simplified flow diagrams 400a-b illustrating example interactions between a privacy broker (e.g., 205) and identity provider (e.g., 210) in connection with a user (at 405) transaction with a particular web application (e.g., hosted by host 410). In one example, a transaction can be initiated between a user 405 and web application 410. Initiation of the transaction can involve, in some instances, the user 405 receiving data and resources from the web application 410, such as a webpage, web application data and services, etc. Initiation of the transaction or session can further involve the user 405 electing to log-in to or otherwise be authenticated to the web application 410, among other examples. In the example of FIG. 4A, initiation of a transaction between the user 405 and the web application 410 can involve the user logging-in to an identity provider 210, to authenticate the user at the identity provider 210. Additionally, transaction data can be forwarded from the user's device 405 to a privacy broker identifying the web application 410 and information requested by the web application 410 in connection with authenticating, signing-in, customizing, or otherwise providing additionally services and data of the web application 410 to the user 405. In other instances, transaction data can also be forwarded directly from the web application 410 to the privacy broker in lieu of, or in addition to, transaction data (or brokered authentication requests) from the user 405.

The privacy broker 205 can receive information identifying the identity of the web application 410 and information that is requested of the web application 410. The identity of the user 405 can be hidden, or otherwise not shared with the privacy broker 205. Further, the identity provider 210 can identify the user 405, for instance, from the user's login at the identity provider 205, so that the user 405 is not anonymous to the identity provider 210 (but remains anonymous to the privacy broker 205 and web application 410). Preferably, the identity of the web application 410 used by the user 405 is kept anonymous to the identity provider 210, shielding the identity provider's 210 ability to track the precise online activities and history of the user 405. Additional data within the transaction data, request for brokered authentication, and login can be used to link the transaction between the web application 410 and user 405 with the request for brokered authentication received by the privacy broker 205 and login data identifying the user 405 to the identity provider. Such data can be used as the basis of a communication between the privacy broker 205 and identity provider in the negotiation of a private ID corresponding to the transaction between the user 405 and the web application 410. The private ID can be unique to the pairing of the particular user 405 and web application 410 while masking the identity of the user 405 to the privacy broker 205 and masking the identity of the web application 410 to the identity provider 210.

Turning to FIG. 4B, upon jointly negotiating and determining (or generating) a private ID for the transaction involving the user 405 and the web application 410, privacy broker 205 and identity provider 210 can each maintain the private ID for a session communicating user information from the identity provider 210 to the web application 410 in connection with the user's 405 transaction or session with the web application 410. Such communications can be identified to the web application 410 via the private ID instead of the actual name or other personal information of the user. The user information can also include information for logging the user 405 in at the web application, such as a confirmation that the user 405 has been authenticated at the identity provider 210. For instance, the generated private ID can be communicated to the user device 405 to be forwarded to the web application 410 in connection with the logging-in of the user 405 at the web application 410. The user 405 can then further participate in a transaction or session with the web application 410, logged-in anonymously under the generated private ID, the identity provider 210 thereby serving as a kind of single sign-on service.

A variety of techniques and messages can be utilized between a privacy broker (e.g., 205) and identity provider (e.g., 210), as well as a variety of different algorithms in the generation of unique private IDs according to the principles outlined above in the examples of FIGS. 4A-4B. Turning to the example of FIGS. 5A-5B, a more particular example is illustrated of messaging and coordination between a particular example implementation of a privacy broker 205 and a particular example implementation of identity provider 210. A user 505 desiring to consume services or content of a particular host (e.g., web application 510) can send a request 522 to the web application and have content 524 delivered in response. In this example, the content, a website of the web application 510, can provide the option to login or otherwise identify the user 505 to the web application 510, for instance, to complete an ecommerce transaction, receive personalized services or content, login to a subscription, etc. In this example, a user 505 can select to login (e.g., at 525) to the web application 510 prompting the web application 510 to redirect (526) the user (i.e., the user's device) 505 to a privacy broker 205 associated with, subscribed to, or otherwise utilized by the web application.

Figure 5A:
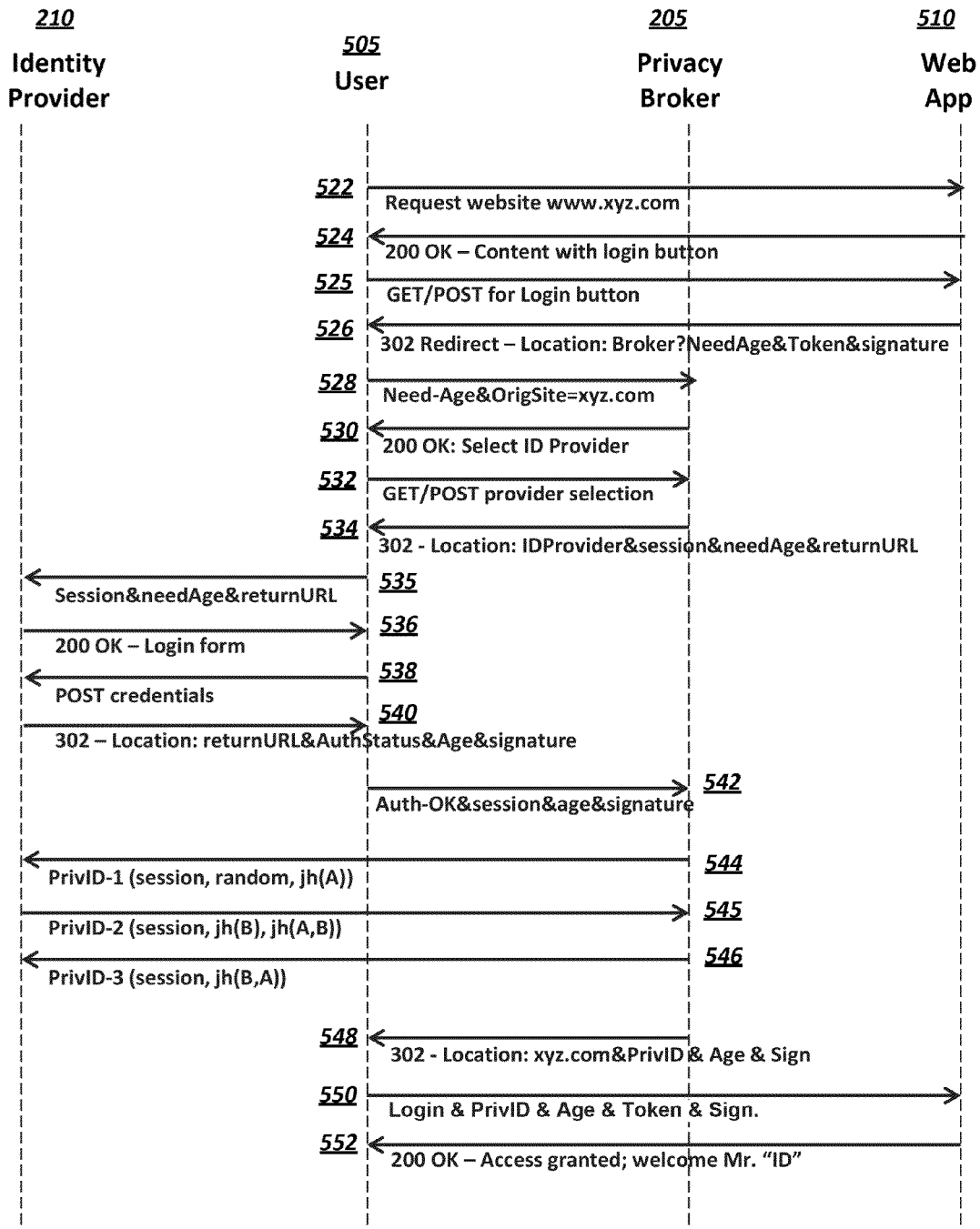
FIG. 5A is a simplified swim lane diagram illustrating example communications involving a privacy broker, identity provider, host, and user in accordance with at least one embodiment.

In the particular example of FIG. 5A, the redirect (526) from the web application 510 to the privacy broker 205 can include data identifying various characteristics of the interaction between the user 505 and the web application 510. For instance, in this example, the redirect (526) can include a request for an age verification, a session token, and a signature authenticating the user 505 at an accepted identity provider (e.g., 210) and, in some cases, used in encryption of the messages between the user's device 505, the web application 510 (and, in some cases, also the privacy broker 205 and/or identity provider 210). This request can be processed and communicated (528) to the privacy broker 205. On the basis of responses to this request or messages confirming authentication of the user at the identity provider 210, the web application 510 may authenticate the user 505 to account information specific to the web application 510 and authorize the user 505 to consume resources hosted through the web application 510 in accordance with the account.

In one implementation, the redirect (526) can serve to cause the user device 505 to forward a request (528) to the privacy broker 205 identified in the redirect (526) indicating that the privacy broker 205 should broker the anonymous retrieval and communication of personal information of the user 505 to the requesting web application 510. In connection with this brokering, the privacy broker 205 can request (530) the user 505 to select or otherwise identify a particular identity provider (e.g., 210) that is used by the user 505 as a repository for personal information, single sign-on services, etc. Additionally, the privacy broker 205 can condition the selection of an identity provider to identity providers that are adapted to cooperatively function with the privacy broker 505. This can include, in some instances, a registration of particular identity providers with the privacy broker 205 (as well as registration of privacy brokers with the identity providers). This can serve the user by allowing privacy brokers and identity providers to additionally cross-check the reliability, quality, and trustworthiness of identity providers or privacy brokers utilized by or subscribed to by a user (e.g., 405). Alternatively, in some implementations, the web application 510 can maintain relationships with one or more identity providers (e.g., 210) and either provide the user with a choice of identity provider, or automatically select the identity provider that the web application 510 prefers to be used in the transaction. In such instances, the web application 510 can identify the identity provider (e.g., 210) in the redirect 526 to the privacy broker 205, allowing communications to skip messages 530-532, among other examples.

Upon receiving a selection (532) of a particular identity provider (e.g., 210) (or otherwise identifying the identity provider to be used in the session), the privacy broker 205 can redirect (534) the user 505 to the identified identity provider 210. The redirect (534) can further cause the request of the web application 510 to be communicated (535) to the identity provider 510 (i.e., while hiding the identity of the web application 510). Further, the identity provider 510 can provide (536) the user 505 with a digital form for completing the user's login to an associated account of the identity provider 210. The credentials of the user 505 can be communicated (538) to the identity provider 210 to attempt to identify the user 505 and authenticate the user 505 to a particular account of user information maintained at the identity provider 210. Further, upon authenticating the user 505, the identity provider 210 can identify, for instance, from the redirect message (535) from the user 505, what information is to be provided to the requesting anonymous web application 510. For example, the identity provider 210 can identify that a request has been made to identify whether the user is over a certain age (e.g., a legal adult, legal driving age, minimum rental age, etc.). Accordingly, the identity provider 210 can identify the user's 505 account and determine, from personal information included in the user's 505 account, whether the user satisfies the queried age threshold. In some instances, such information may not yet be recorded at the identity provider's 210 account and the identity provider 210 can provide further forms and accept additional data from the user 505 confirming or obtaining the information the identity provider 210 will use to respond to or confirm in response to the web application's 510 request.

In response to authenticating the user 505, the user 505 can be further redirected (540) from the identity provider 210 to the privacy broker 205. In the example of FIG. 5A, authentication data can be sent (542) to the user device 505 for delivery to the privacy broker 205, allowing the privacy broker 205 to confirm that the user 505 has been authenticated to the identity provider. The authentication data can take a variety of forms according to wide array of schemes allowing the privacy broker 205 to confirm both the authenticity of the authentication data (e.g., that it arrived untampered from the identity provider 210) and the authentication of the user 505 at the identity provider 210. The authentication data (such as included session information) can also be used to identify that the authentication pertains to the same user 505 for which the redirect (at 534) to the identity provider 210 was issued. For instance, the authentication data (542) can be sent in an encrypted payload, encrypted using a public key of the privacy broker 205, or through a channel encrypted, for instance, using the signature, among other example implementations. Further, the authentication message(s) (542) communicated from the identity provider 210 to the privacy broker 205 can include the results of an information request based on user information maintained at the identity provider 210. Such information can also be included in an encrypted payload in some examples intended for the requesting web application 510. In the present example, identity provider 210 can retrieve personal information for the user 505 relating to the user's age. In some instances, the identity provider 210 can send an identification of the user's age in the transmission 540. In other examples, however, the identity provider 210 can filter the information provided so as to mask the precise values of the user's account information. For example, rather than indicating the user's exact age, the identity provider 210 can provide a range of values, a Boolean value (e.g., indicating true or false for whether the user meets or exceeds a particular age limit of the web application, etc.), among other examples. For instance, an identity provider 210 can provide a response to a request for location information for the user 505 with generalized information (e.g., the country or state of the user) rather than more particularized information (e.g., the address of the user, etc.), as another example. Further, a privacy broker 205 can assist in the generalization of user information shared with third party hosts (e.g., 510) by defining, in some instances, sets of rules for information requests of web applications to assist web applications in making requests that the identity provider can answer without divulging unnecessarily specific user data, among other examples.

In the example of FIG. 5A, authentication data (540) is sent to the user device 505 and then forwarded (542) by the user device 505 to the privacy broker 205. In other instances, all or a portion of the authentication data can be forwarded directly from the identity provider to the privacy broker 205. In either instance, authentication of the user 505 at the identity provider 210 can serve, not only to authenticate the user's 505 legitimate use of the privacy broker 205, but also authenticate the identity provider 210. The privacy broker 205, in response, can attempt to initiate generation of a private ID for the user's 505 interaction with the web application 510. In the present example, the privacy broker 205 and identity provider 210 generate a privacy ID from identifiers of each of the particular user 505 (known only to the identity provider 210 in this transaction) and the particular web application 510 (known only to the privacy broker 205 in this transaction). The identifier of the particular user and identifier of the particular web application can be hashed or otherwise obscured and provided as inputs into a formula or algorithm that generates a unique private ID for the user 505 in their transactions with the particular web application 510. Indeed, in some examples, each time the identifiers of the particular user and particular web application are provided as inputs to the algorithm, the same private ID can be generated.

In the particular example of FIG. 5A, privacy broker 505 and identity provider 510 can hash identifiers of particular web application and particular user, respectively, in connection with the use of an example joint hash algorithm, jh( ), as set forth in more detail below. The privacy broker 505 and identity provider 510 can thus jointly construct a private ID for the particular web application-user pairing, through the exchange of messages 544-546. The generated private ID can then be shared with the user 505 for use in authenticating the user 505 at the web application (at 550). The user 505 can also deliver (at 550) user information obtained from the identity provider 210 in response to a web application's request (e.g., at 534), such as the indication that the user 505 is of a certain age, among other examples. The web application 510 can then identify a user account (or alternatively generate a new user account) associated with the private ID, and provide (e.g., 552) data, content, and services to the anonymous user 505 while recognizing repeat visits of the user 505. Indeed, an alias, such as a username can be created for or designated by the user 505 at the web application that is bound to the received private ID, and other information can be collected and stored by the web application and associated with the private ID. In such instances, information collected by the web application 510 can be limited, in some cases, to the user's 505 specific interactions with the web application 510 or its affiliates while authenticated using the private ID. Such information can then be used to not only identify repeat visits by the user 505 (e.g., also resulting in the (re-)creation of the private ID), but also to tailor the user's experience according to the previously collected account data for that particular web application 510, among other examples.

As noted above, algorithms can be used to generate a unique private ID based on secret data held by two entities, A and B, for instance, a privacy broker and a particular identity provider. In one example, secret data ($S_A$ and $S_B$) can describe information held by two entities A and B that is not to be shared with the other entity, such as the identity of a particular web application by entity A and the identity of a particular user by entity B. Using their respective secret data, however, the entities can jointly generate a descriptor, identifier, or token (e.g., a private ID) according to a hash function $h(S_A, S_B)$. In some instances, the algorithm can be adapted to use a function $h(S_A, S_B)$ that will always create the same persistent result for the same pair ($S_A$, $S_B$) but that will create different persistent results for other pairs of input data (e.g., different user-web application pairings). Further, the algorithm can provide a one-way function that generates an identifier that allows for the privacy or secret nature of the data inputs ($S_A$, $S_B$) to be maintained, with each entity unable to reasonably determine the input values from the function result. Indeed, the algorithm can hinder the other party's ability to identify that the other's input value was the same as in another instance of the function or even whether the other entity's input was different. For instance, the function can be called twice, one time with parameters $h_1=h(S_{A1}, S_B)$ (e.g., corresponding to first web application, represented by $S_{A1}$, paired to a first user, represented by $S_B$), and a second time with parameters $h_2=h(S_{A2}, S_B)$ (with a second web application, $S_{A2}$, paired with the first user). In this case A should not be able to determine from $h_1$ and $h_2$ that B used the same $S_B$ input value for both function calls. B, however, can know that $S_{A1}$ and $S_{A2}$ are different values because otherwise $h_1$ would be equal to $h_2$. That said, in this example, B will not be able to determine when $S_{A1}$ and $S_{A2}$ are used in other calls to function $h()$, when B uses parameters different from $S_B$. Such algorithms can be beneficial, as it can allow private IDs to be generated that cannot be readily processed to identify when the same anonymous web application (hidden from an identity provider) or same user (hidden from a privacy broker) are involved in other private ID transactions between the identity provider and privacy broker.

In one implementation, a joint hash algorithm can be used to generate private IDs. In the joint hash algorithm example, two parties jointly generating the private ID can negotiate starting values for use in generating the private ID. For instance, entities A and B can agree on:
1) a number N representing the number of bits that will be used in subsequent operations of the algorithm. If N is too small, the strength of the joint hash function's result may be compromised. In some instances, N may equal N=2048 bits.
2) a set of N prime numbers (i.e., P-Set). With N being at an acceptable size, values of the prime numbers can be as large or small as desired without impacting the joint hash function's effectiveness. For instance, the agreed-upon P-Set could be: P-Set={2; 3, 5; 7; 11; . . . } with N elements.
3) a prime number p with N bits. Preferably, the prime number p is generated from a random input (e.g., one provided by one of the entities A and B).

In some instances, an entity A can utilize the same joint hash function to create descriptors (e.g., private IDs), with one or more partnering entities. For instance, in addition to a relationship with entity B, A can partner with other entities, such as entities C, D, E, etc. Indeed, it is acceptable, using the joint hash function, if the number N and the set of primes, P-Set, are the same in each relationship of entity A, assuming that each partnership has selected or generated a unique and random prime number p.

Arithmetic for the joint hash function can be carried out as a finite field $Fp=Z/pZ=\{0, 1, \ldots, p-1\}$, so that arithmetic utilizes arithmetic modulo p. This can result in values that always have a maximum of N bits. Also within this field the following equation is valid and can be leveraged as the basis for the joint hash algorithm:

$$(x^a)^b \cdot (y^b)^a = (x \cdot y)^{(a \cdot b)}$$

As a first step in the joint hash algorithm, a first entity A can use a private function (such as a private hash function) to generate a number a within Fp from a secret string value $S_A$ maintained by entity A. Similarly, a second, partnering entity, entity B, can utilize its own private function (such as a different hash function) to generate a number b within Fp from its private string value $S_B$. The respective private functions of the entities A and B can be independent and different from the hashing functions used elsewhere in the joint hash algorithm (e.g., jh). Regardless of the type of hashing or private functions used by entities A and B, the values of a and b, preferably, will be values within Fp that are not readily interpretable or guessable by the other entity (e.g., to determine the underlying secret string value(s)). For instance, in one example implementation, a and b can be generated by creating an SHA-1 hash from each respective secret string value $S_A$, $S_B$ and then encoding each hash with a public key of a self-generated RSA key pair with N bits, so that the resulting a and b values each also have N bits and are statistically well distributed. Other implementations, including other standard hash functions, can be used in the generation of a and b, as well as jh( ).

A joint hash function jh( ) can be formulated that ensures that the product ($z=x \cdot y$) will always have the same results, while x and y can be randomly unique for each function call. This can be achieved by generating x and y as products from values of the set P-Set so that $z=x \cdot y$ will always be the product of all values of P-Set (or P), i.e., $$z = x \cdot y = \left(\prod_{p_i \in P} p_i\right) \bmod p$$

In some instances, it can be preferable that cooperating entities A and B at least attempt to use a different combination of x and y values each time each time the function jh( ) is called. This notwithstanding, in the present example, the product z will be the same at each call of function jh( ) despite A and B using varying values of x and y. This can be achieved by entities A and B agreeing upon and using a random value to randomize or otherwise vary the respective values of x and y used at each call of jh( ). For instance, before calling jh( ), entities A and B can each create a random value with N digits; $r_A$ generated by A and $r_B$ generated by B. Both entities can then send each other their respective random value. From these values (e.g., $r_A$ and $r_B$), both entities can generate a common, combined random value, for instance, according to $r=r_A$ xor $r_B$. Each entity can then keep track of the random values sent by a respective peer over a series of calls of function jh( ), rejecting the generation of new joint hashes if the entropy of the peer's random values drops below an acceptable level, for instance. Values of x and y, can be varied non-randomly, in other examples, such as an implementation using an external authority providing new combinations of x and y to A and B following a given and known algorithm or pattern, among other examples.

In instances where entities A and B attempt to generate randomized inputs for function jh( ), A can generate x and B can generate y by multiplying on those values from P-Set, for which the corresponding bit in r is cleared (e.g., for generating x) or the bit is set (e.g., for generating y), or vice versa, among other potential examples. More formally, such operations could be written as:

$$x = \left(\prod_{Bit(r,i)=0} p_i\right) \bmod p$$

and, $$y = \left(\prod_{Bit(r,i)=1} p_i\right) \bmod p$$

where Bit (r,i) provides the value of the i-th bit in the N bit word random r. Due to the random values and because all $p_i$ are prime numbers in this example, there are 2N different combinations of x and y, but the product x·y is always equal to a constant z. In other words, there are 2N different decompositions of z into products x·y in such an example.

In one example implementation, after the generation of x and y, A and B create their first inputs of the function jh( ):

$$jh_A = x^a \bmod p,$$

and $$jh_B = y^b \bmod p$$

The input values $jh_A$ and $jh_B$ can then be exchanged with the respective peer entity (i.e., either entity A or B). Using the values of $jh_x$ received from the respective peer entity, A can then generate:

$$jh_{B,A} = (jh_B)^a \bmod p$$

and B can generate:

$$jh_{A,B} = (jh_A)^b \bmod p$$

The values of $jh_{B,A}$ and $jh_{A,B}$ can then be once more exchanged with the respective peer entity, allowing each of entity A and B to generate the final descriptor result (e.g., the private ID), which is the product of both last calculations:

$$jh = (jh_{A,B} \cdot jh_{B,A}) \bmod p$$

Independent of the random decomposition of z into x and y, each calculation of jh is thus:

$$jh = z^{a \cdot b} \bmod p$$

and because a value of N has been selected of sufficient size, B cannot recreate a out of $jh_A$ although it knows x and p, nor is it likely to recreate a out of $jh_{B,A}$ through any justifiable effort. Similarly, A is not likely to be able to readily recreate b out of $jh_B$ although it knows y and p, nor is it likely to recreate b out of $jh_{A,B}$, etc.

In examples such as the above, a joint hash algorithm can include at least three exchanges of data pairs between A and B: ($r_A$, $r_B$); ($jh_A$, $jh_B$); ($jh_{A,B}$, $jh_{B,A}$). However, in some instance, if B trusts A to generate good random numbers (and monitors and verifies that this is really the case), then the data exchange can be simplified with A (or alternatively B) independently generating a final random value r and sending the value of r directly to B together with the value $jh_A$ that it generated (such as at 544 in the example of FIG. 5A). B can then respond with $jh_B$ and $jh_{A,B}$ in a first response (e.g., 545), allowing A to generate $jh_{B,A}$ and the final jh. In some instances, $jh_{B,A}$ and its generated instance of jh can still be sent (e.g., 546) from A to B, for instance, for logging purposes at B, among other examples.

Figure 5B:
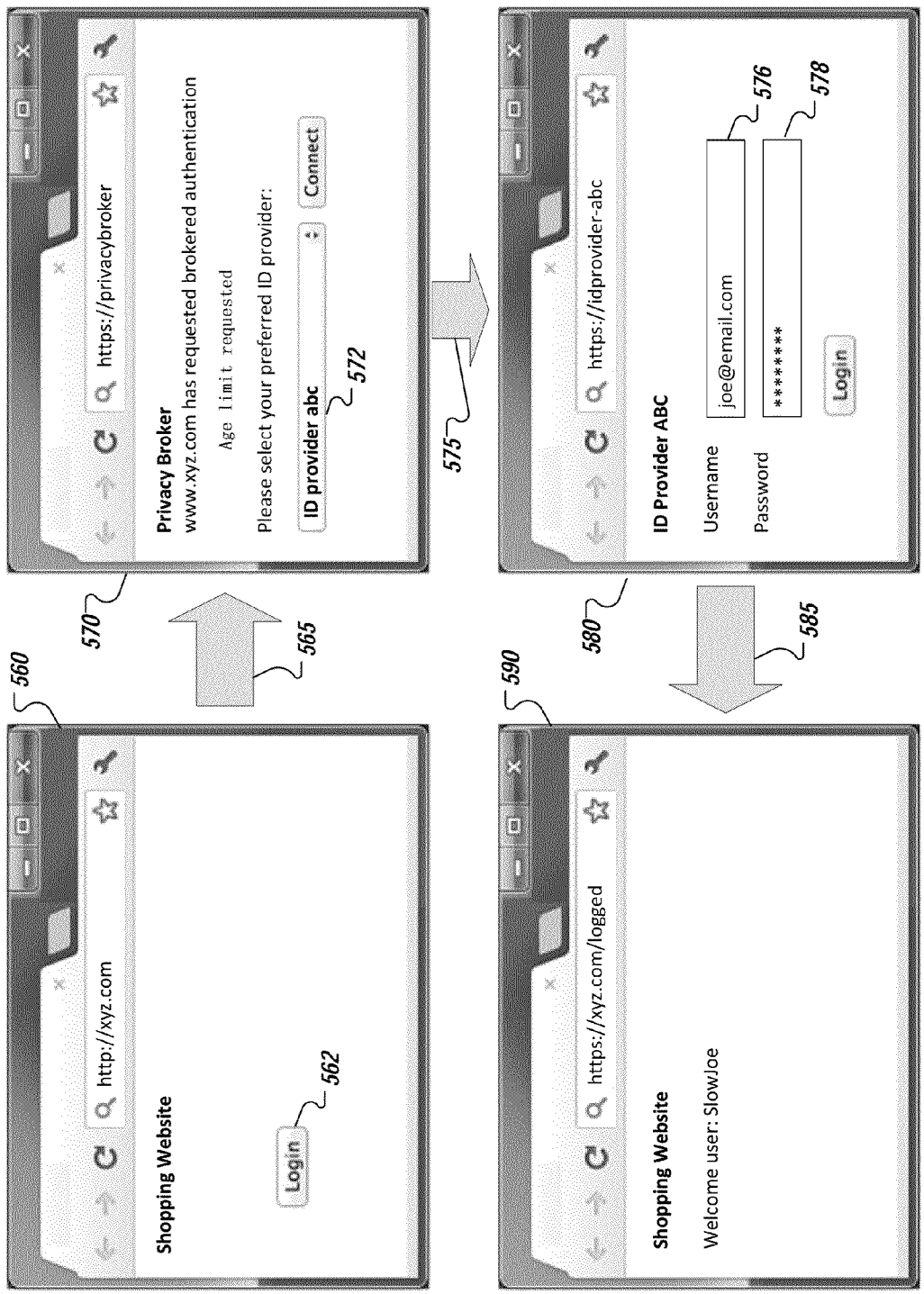
FIG. 5B illustrates example screenshots of user interfaces presented to a user in connection with communications similar to those described in connection with FIG. 5A and in accordance with at least one embodiment.

Turning to FIG. 5B, a variety of graphical user interfaces (e.g., 560, 570, 580, 590) can be presented and used in connection with the authentication of a user (e.g., 505) at a particular web application (e.g., 510) through the assistance of a privacy broker (e.g., 205). For example, a web application, such as a shopping website, can provide data to a user device that can be rendered as user interface 560. The user may be able to consume certain resources or perform certain actions offered through the web application, however, logging-into the site or registering with the provider of the web application may enable additional services, actions, privileges, and features. For instance, a user can select a login button 562 to initiate a login or authentication sequence involving the generation of a private ID using, for instance, a privacy broker and identity provider. Indeed, as in the example of FIG. 5A, a redirect 565 can be triggered through the selection of login button 562 directing the user to the privacy broker and causing a user interface 570 of the privacy broker to be rendered on the user device. The user interface 570 of the privacy broker can provide details of the request to assist the user in understanding the nature of the redirect, such as the identity of the web application, the nature of the privacy broker's involvement, personal information sought by the web application in connection with the brokered authentication, etc. Additionally, in this particular example, the privacy broker user interface 570 can additionally include a control 572, such as dropdown menu, that allows a user to identify and select, from a group of available identity providers, an identity provider with which the user has an account or which otherwise hosts user information for the user. Such an interface (e.g., 570), can be omitted in other implementations, such as where the web application sets the identity provider to be used during the session or provides the identity provider selection to the user for communication to the privacy broker (e.g., through the redirect 565 from the web application to the privacy broker), among other alternatives and examples.

Selection of a particular identity provider, for instance, at privacy broker user interface 570, can cause the user to be redirected 575 to the selected identity provider and a user interface 580 of the identity provider can be consequently rendered on the user device. The user interface 580 of the identity provider can include fields (e.g., 576, 578) allowing the user to enter credentials for authenticating the user at the identity provider. As noted in the example of FIG. 5A, authentication of the user at the identity provider can prompt messaging between the identity provider and privacy broker in connection with the (re-)generation of a unique private ID corresponding to the pairing of the user and web application (e.g., xyz.com). This negotiation and private ID generation process can be carried out in the background and lead to a private ID being generated and made available for use in completing (e.g., 585) the user's login at the web application (e.g., through a redirect from the identity provider to a privacy broker that then redirects the user to the web application (as the web application's identity can be unavailable to the identity provider for a redirect directly to the web application)). Accordingly, a login welcome screen user interface 590 can be provided to the user acknowledging that the web application has recognized and accepted the generated private ID, as well as, in some instances, leading to the web application identifying an account associated with the anonymous user and the private ID.

During sessions authenticated through brokering by a privacy broker and use of a generated unique private ID, the web application can make further use of the private ID and privacy broker to conduct additional activities and transactions pertaining to its session or interactions with the user paired, with the web application, to the private ID. For instance, in one example use case, illustrated in the simplified flow diagram 600 of FIG. 6, an example web application 510 may desire to send an email to the anonymous user 505. This can be problematic in that sharing of the user's email address with the web application may result in more information being shared than the user wishes to reveal in order to maintain the privacy provided, at least in part, through the use of a privacy broker 205.

Figure 6:
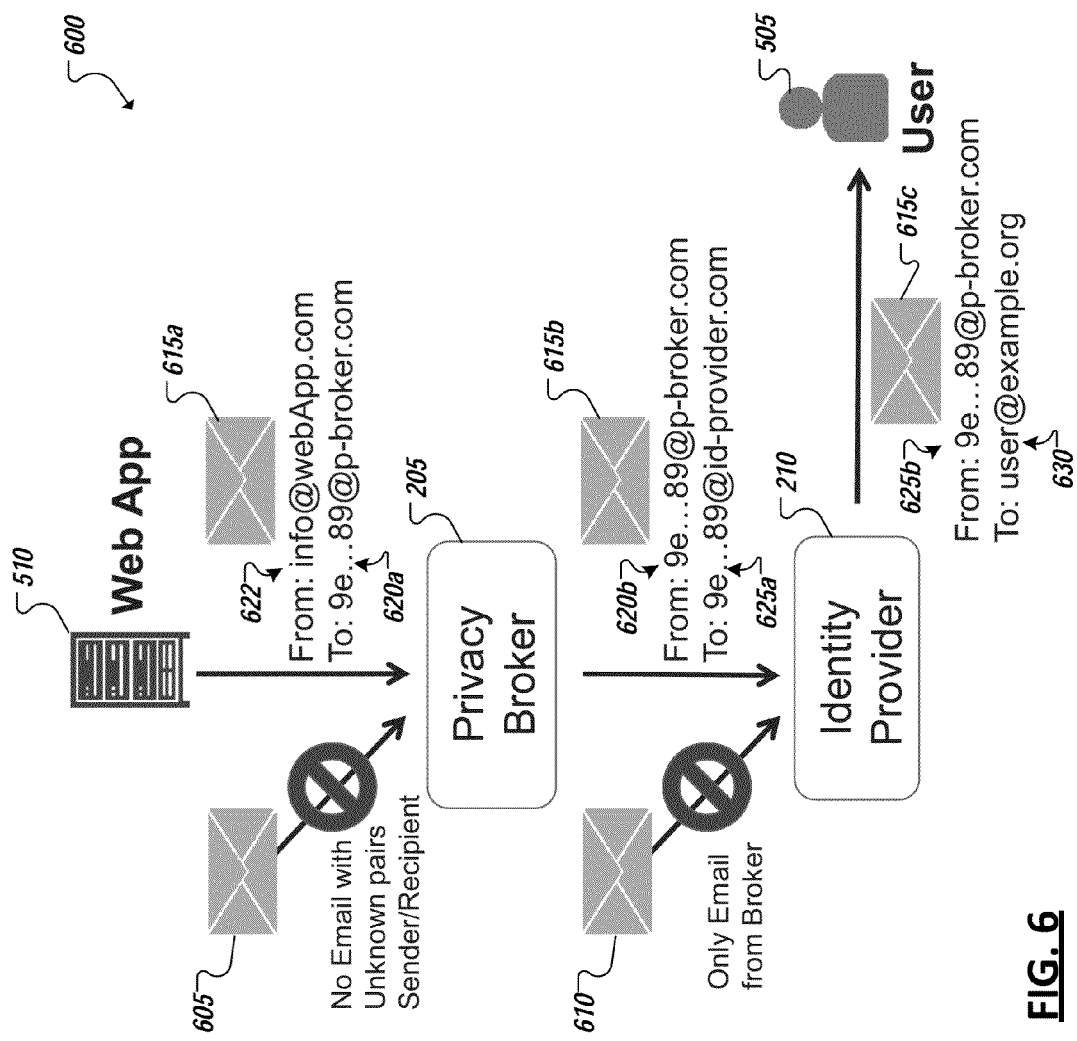
FIG. 6 is a simplified flow diagram illustrating use of an example privacy broker in an electronic mail transaction in accordance with at least one embodiment.

In the example of FIG. 6, the privacy broker 205, identity provider 210 of the user 505, and generated private ID for the user 505 and web application 510 pairing can be used to facilitate the sending of emails from the web application to the user. In some implementations, web applications (e.g., 510) can send email through the privacy broker 205 for forwarding onto the identity provider 210 and then to the user 505. Rules can be in place dictating the types of emails that can be sent through the privacy broker 205 and identity provider 210 respectively. For instance, a rule 605 at the privacy broker 205 can dictate that emails be addressed to a known recipient (e.g., as identified by the recipient's private ID) and from a known sender (e.g., a web application with which the privacy broker 205 has a relationship, such as one whose identity is bound to a particular known private ID). A rule 610 at the identity provider 210 can dictate that only emails forwarded through a trusted privacy broker 205 be forwarded to its users (e.g., using email address information maintained by the identity provider 210), among other examples.

In the particular example of FIG. 6, a web application 510 can send an email 615 to an anonymous user (e.g., 505) using the private ID of the anonymous user. For example, the email 615*a* can be initially addressed (e.g., at 620*a*) to the private ID at a domain of the privacy broker, and from the web application (e.g., at 622). The privacy broker 205 can receive the email 615*a* from the web application and modify the addressing and headers of the email 615*a* to hide or remove the identity of the web application from the identity provider, for instance, to preserve the anonymity of the user's 505 association with the web application 510 and the web application's 510 pairing to the particular private ID. Further the web application or privacy broker 205 can encrypt the contents of the email 615 for decryption at the user's device to further mask the identity of the web application from the identity provider 210 (e.g., if the web application identity can be identified in the email's contents, among other examples). In the example of FIG. 6, the privacy broker 205 can re-address the email (e.g., 615*b*) so that the email 615*b* is addressed (e.g., at 620*b*) anonymously according to the domain of the privacy broker 205 to hide the identity of the web application-sender. The address 620 can also indicate the private ID of the user-web application pairing (505, 510) in some implementations. The email 615*b* can also be addressed (625*a*) to forward the email 615*b* to the identity provider 210 for delivery of the email 615*b* to the identity provider 210. For instance, the email 615*b* can be addressed to the private ID at the domain of the identity provider 210, among other potential examples. Upon receiving the email 615*b*, the identity provider 210 can identify a user account of the user 505 associated with the private ID included in the email 615*b* (e.g., in address information 620*b*, 625*a*) along with email address information (e.g., 630) of the user account. The identity provider 210 can readdress the email 615*b* (to 615*c*) to forward the email from the web application 510 to the email address 630 of the user 505 (and from identity provider domain address 625*b*) and complete delivery of the email, among other examples.

Figure 7A:
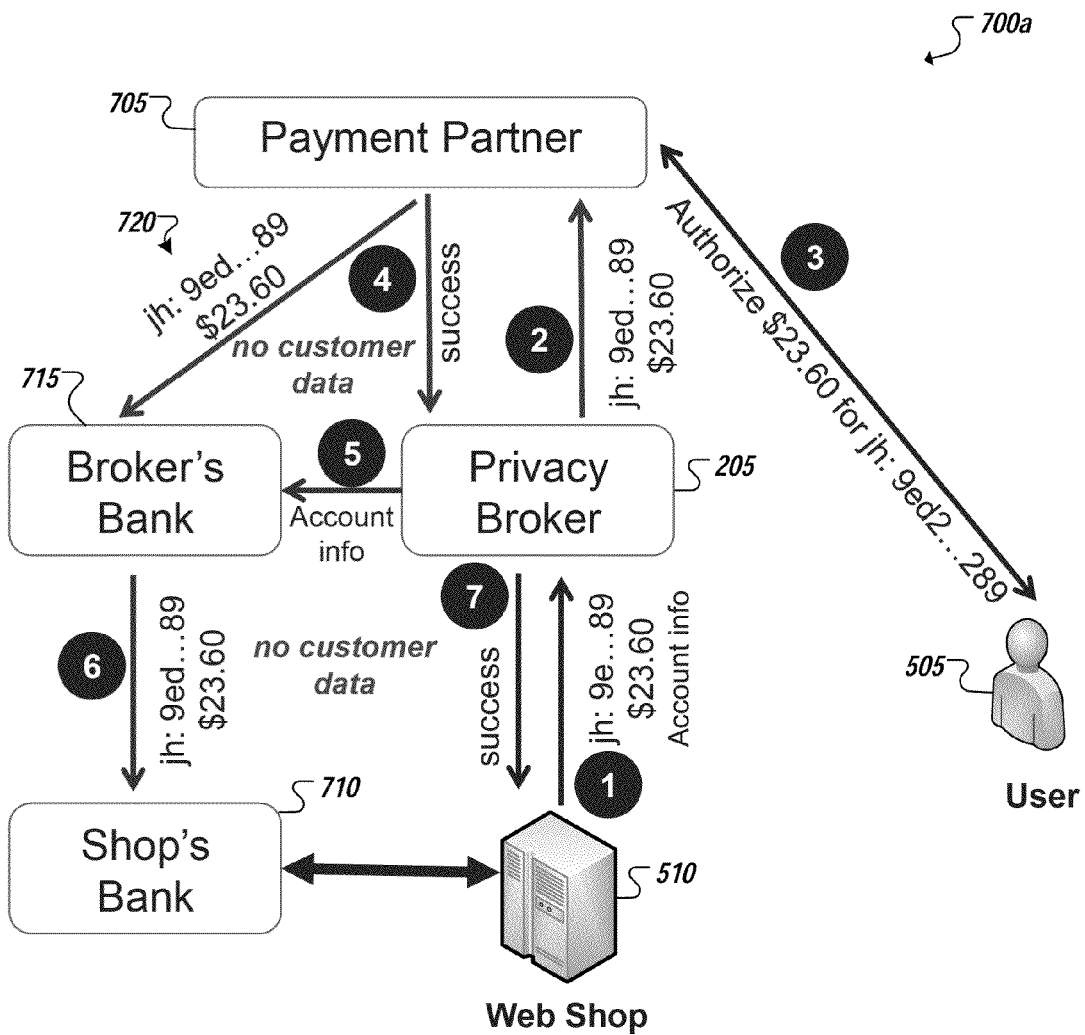
FIGS. 7A-7B are simplified flow diagrams illustrating uses of an example privacy broker in private shipping transactions in accordance with at least some embodiments.
Figure 7B:
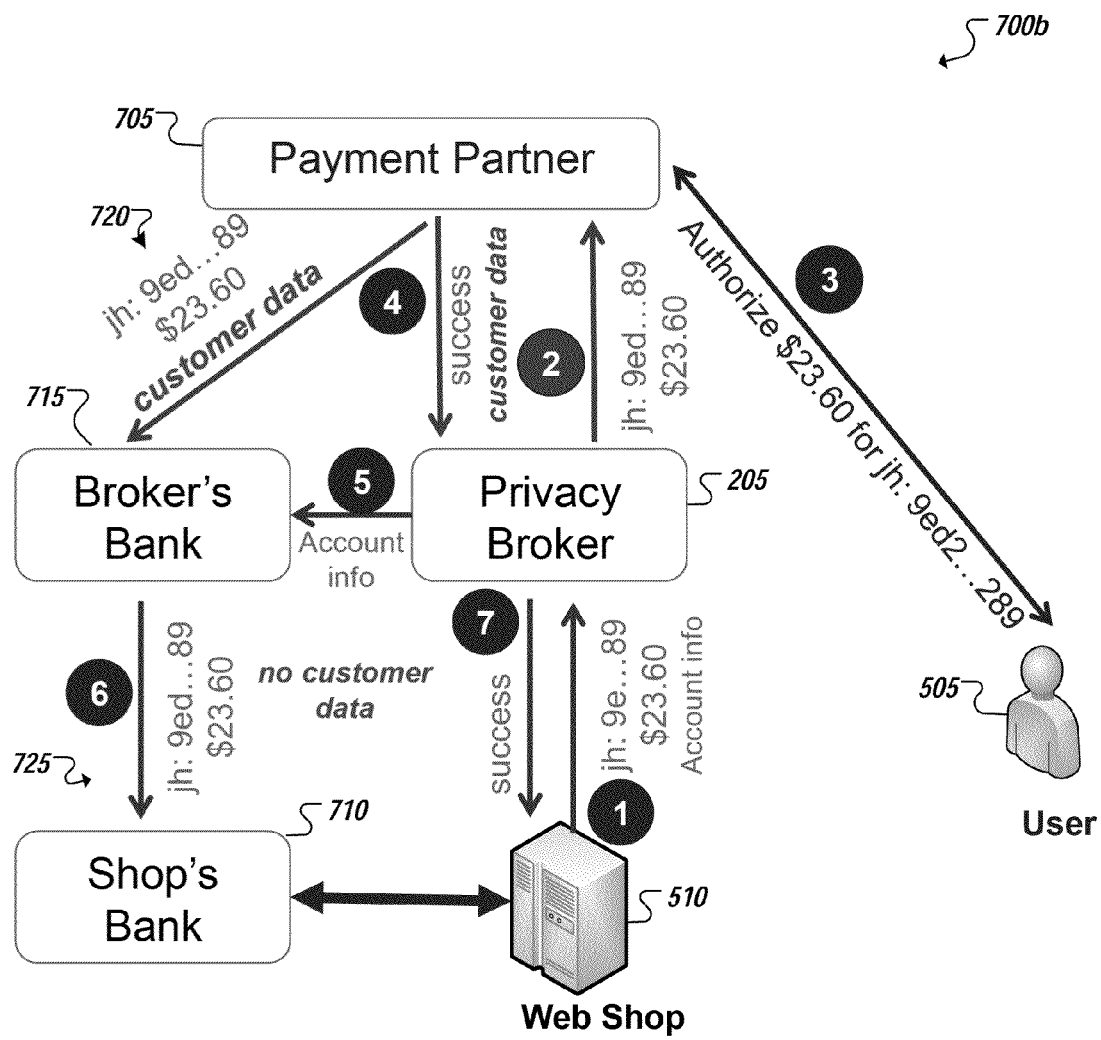

In another example, illustrated in the simplified flow diagrams 700*a-b* of FIGS. 7A-7B, an anonymous user (e.g., 505) can transact with a web application (e.g., 510) to complete an ecommerce transaction. Ecommerce transactions can involve the exchange of payment information that, ordinarily, would share personal information of the user, such as the user's payment or bank account information. In the examples of FIGS. 7A-7B, a privacy broker 205 can be utilized in connection with a generated private ID bound to a particular user-web application pairing (e.g., 505, 510) to facilitate anonymous payment from the particular user 505 to the web application 510. For instance, in a first example illustrated in FIG. 7A, a user 505 can complete an order for a good or service from the web application 510 in an anonymous ecommerce transaction where the user 505 is authenticated and identified by a private ID paired to the user 505 and web application 510. To facilitate payment for the goods or services, the web application 505 can send a payment request to the privacy broker 205 identifying the private ID of the user 505, the amount of the transaction (e.g., expressed as a value of currency), together with account information corresponding to a financial institution or bank account of the web application 510. The privacy broker 205 can identify a payment partner 705 associated with the private ID and forward the payment request (e.g., message 1) to the payment partner 705. In other instances, the privacy broker 205 can forward the payment request to an identity provider which can in turn identify the payment partner 705 of the user 505 (from the private ID) and forward the payment request to the payment partner 705. Indeed, in some instances, the payment partner 705 can be the identity provider.

In either implementation, the privacy broker 205 can strip the web application's account information from the payment request before forwarding it on to the payment partner 705 or identity provider. The payment provider 705 can then request an authorization of the requested payment from the user 505. The payment provider 705, in some implementations, can identify the payment request according to the private ID, which the user 505 can then use to identify the corresponding, requesting web application 510, in the event the user 505 seeks context for the payment request before authorizing. Upon receiving authorization from the user 505, the payment partner 705 can then submit payment authorization information to each of the privacy broker 205 and the financial institution 715 of the privacy broker 205. In the message to the privacy broker 205, the payment partner 705 can indicate that the user 505 authorized the payment request and thereby commits or guarantees that the payment will take place. The payment commitment can also be forwarded immediately to the web application 510 in some instances. Further, the payment partner 705 can also transfer funds 720 from the bank account of the payment partner 705 of the user 505 to the financial institution 715 of the privacy broker 205, based on the authorization, the payment transfer 720 identifying the payment by the private ID of the user 505 rather than the actual identity of the user 505 (or even the account number of the user 505, etc.). Further, account information of the web application can be forwarded from the privacy broker 205 to the financial institution 715 of the privacy broker 205, thereby insulating the user's 505 involvement with the web application 510 from the payment partner and/or identity provider.

With the guarantee of funds from payment partner 705 and account information of the web application, the financial institution 715 of the privacy broker 205 can complete a second funds transfer 725 to the web application's financial institution 710, thereby completing payment. In such instances, the financial institution 715 of the privacy broker 205 transfers funds in amount equal to the requested payment to the financial institution 710 of the web application, again referencing the payment by the received private ID of the user 505 whose identity is otherwise anonymous to the web application. In some implementations, the privacy broker 205, to reduce latency in the transaction, can (through the financial institution 715 of the privacy broker 205) complete the payment before funds are actually received from the payment partner 705, while in other instances, payment may not complete until the user's own funds are forwarded to the financial institution 715 of the privacy broker 205.

In some implementations, a payment partner used or preferred by the user 505 may not be in a position to transfer funds (e.g., 720) without including at least some information identifying the originating account from which the funds are transferred, among other information of the user 505. As shown in the example of FIG. 7B, a payment partner 705, such as a credit card company, can respond to an authorization from the user 505 of a payment request (e.g., of web application 510) with an authorization confirmation message to the privacy broker 205 and a funds transfer 720 to the financial institution 715 of the privacy broker 205. However, whereas user data of the user 505 was withheld from the messaging from the payment partner 705 to the privacy broker 205 and financial institution 715 of the privacy broker 205 in the example of FIG. 7A, the example of FIG. 7B can provide for some user information to be shared by the payment partner so as to complete the payment transfer. In such instances, the privacy broker 205 can promise not to divulge, share, or persistently store information received from the payment partner 705 that identifies the user 505, and thereby allows the privacy broker 205 to potentially link the user 505 and web application 510 identities to the private ID. While such implementations similar to the example of FIG. 7B can offer less seamless privacy, they can, in some instances, provide for anonymous payment with less coordination between payment partners and the privacy broker 205 potentially permitting users a wider selection of payment partner options in anonymous payment processing performed by an example privacy broker (e.g., 205), among other examples.

Figure 8A:
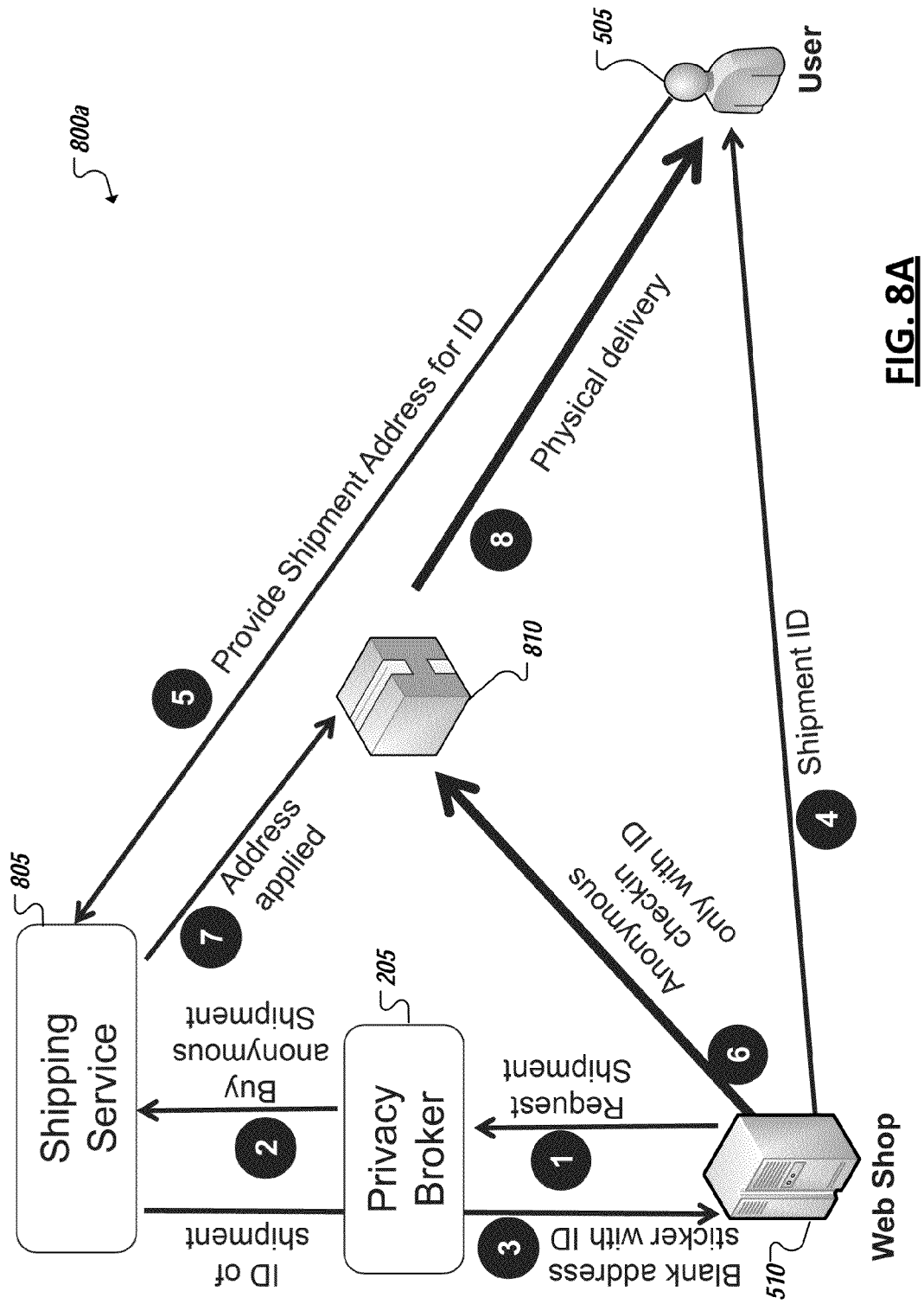
FIGS. 8A-8C are simplified flow diagrams illustrating uses of an example privacy broker in anonymous online payment transactions in accordance with at least some embodiments.
Figure 8B:
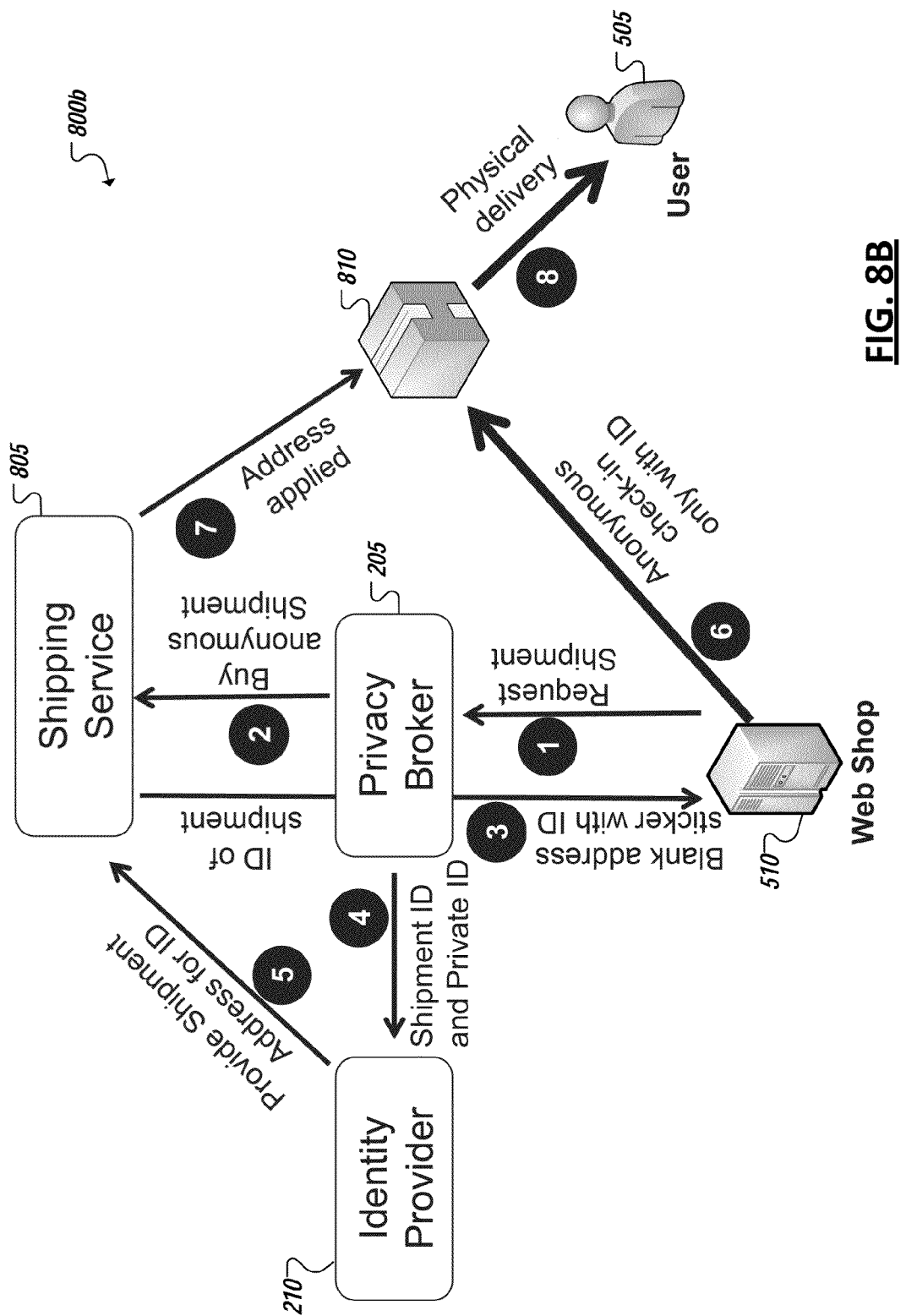
Figure 8C:
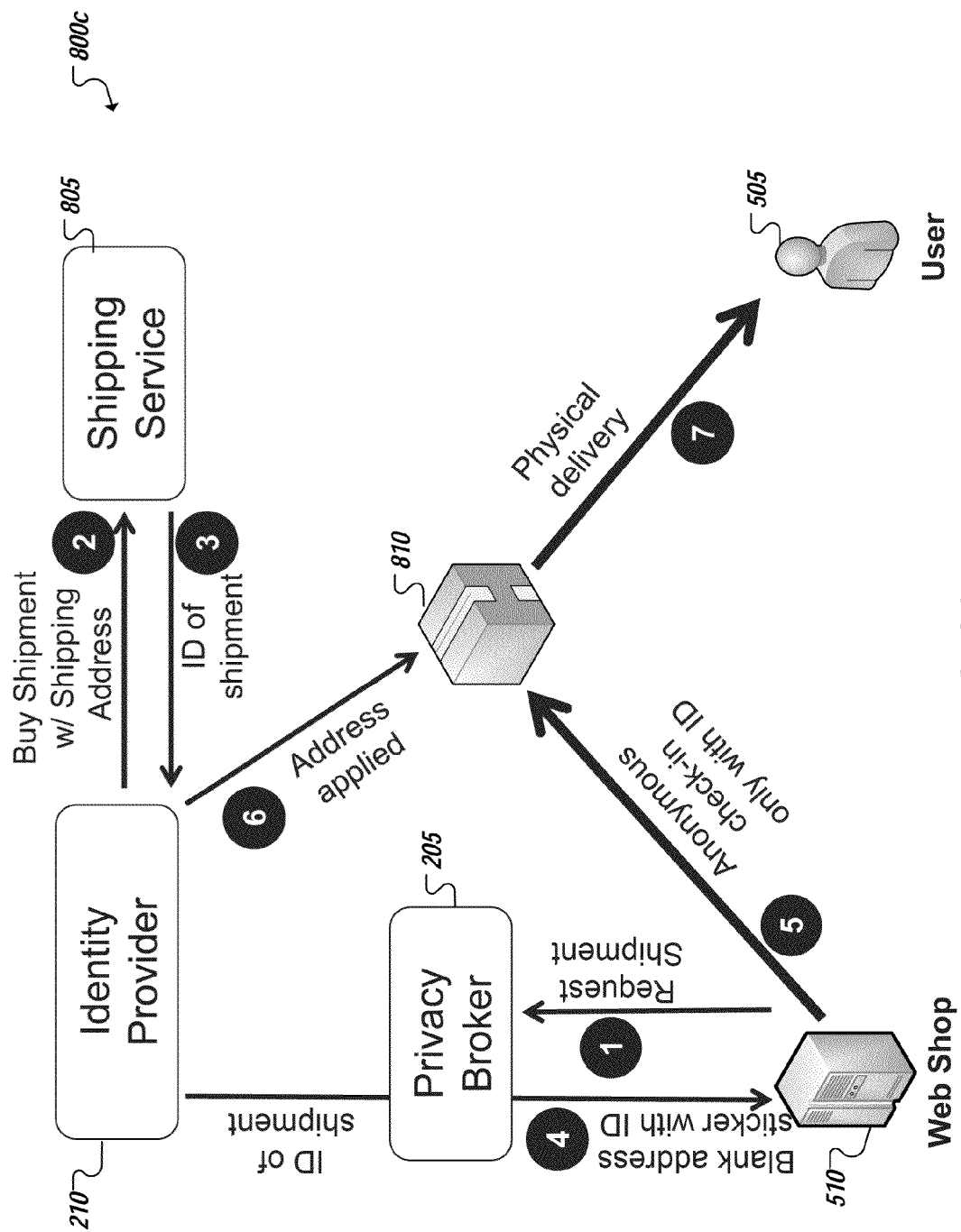

Turning to the examples of FIGS. 8A-8C, simplified flow diagrams 800a-c are shown illustrating additional services of a privacy broker 205. In some implementations, in addition to brokering anonymous authentication and/or payment between users and web applications, a privacy broker 205 can further broker the arrangement of shipping between an entity managing the web application and a user, for instance, in connection with an ecommerce transaction completed between a user 505 and a web application 510 using the privacy broker and an associated private ID paired to the user 505 and a web application 510. For example, as shown in FIG. 8A, a web application 510 can request shipment to the anonymous user 505 bound to the private ID. The web application 510 can send the shipment request to the privacy broker 205, identifying the anonymous user 505 by the private ID. In the example of FIG. 8A, the privacy broker 205 can then communicate with a server associated with a shipping service 805 to broker the arrangement of shipping from the seller or vendor associated with the web application 510 to the user 505. The shipment request can include information identifying the characteristics of the contents to be shipped, such as the weight of the shipment, the type of delivery (e.g., ground, overnight, etc.), the type of contents (e.g., whether any forbidden or otherwise regulated contents are included), among other details that are to be communicated to the shipping service 805. The privacy broker 205 can forward this information to the shipping service 805 and purchase the shipment on behalf of the web application (i.e., to protect against the tracking of the user's association or use of the web application). The shipping service 805 can associate the communicated shipping characteristics a shipment ID generated for the shipment, as well as potentially other information, such as the private ID. Further, the shipping service 805 can calculate a price for the shipment based on the communicated shipping characteristics.

A shipping sticker, package, or other mechanism can be generated by the shipping service 805 for the shipment. Further, the shipment ID can be forwarded to the web application (e.g., through the privacy broker 205) for the ordered and/or purchased shipment. The shipment ID can be communicated to the user 505, for instance, by the web application 510 (in connection with a checkout procedure), or, in other instances, by the privacy broker 205, etc. The user 505 can then utilize the received shipment ID to communicate, outside the session with the web application 510, with the shipping service 805 to provide private details of the user 505 requested for completing the shipment, including the user's name, address, etc. In this way, the shipping service acts as a type of identity provider, knowing personal information of the user 505 but shielded from knowing the identity of the web application 510 (as known by the user 505 and privacy broker 205).

Having been paid (or promised payment) for the shipment (e.g., by the web application 510 through the privacy broker 205), and received address information from the recipient user 505, the shipping service 805 can associate the received address information with the purchased shipment ID. Accordingly, an entity of the web application can arrange for pick-up or drop-off of the package 810 to be shipped under the corresponding shipment ID according to the processes of the shipping service 805. The package 810, as received from the web application entity, however, will not include address information of the recipient user 505 (i.e., as the address information of the recipient-user, as well as the identity of the recipient, is unknown to the web application). Instead, the shipping service 805, upon taking possession of the package 810 for delivery, can identify the received address information as associated with the shipment ID of package and apply the received address information to complete physical delivery of the package 810 to the user 505 based on this association.

In another implementation, illustrated in the example of FIG. 8B, involvement of the user 505 can be limited in coordinating anonymous shipment from the web application to the user 505 by, for instance, involving services of an identity provider 210 associated with the user 505. For example, a shipment request can be forwarded to the shipping service 805 by the privacy broker 205 as in the preceding example, with the privacy broker procuring an appropriate shipment on behalf of and according to the shipment request of the web application 510. The web application 510 can be supplied with the shipment ID for the ordered, anonymous shipment, while the privacy broker 205 utilizes the private ID associated with the web application 510 and user 505 to engage the identity provider 210 in the arrangement of the shipment. For instance, the privacy broker 205 can communicate the received shipment ID together with the private ID of the web application 510 and user 505 pairing along with a request to provide address information for the user 505 to the shipping service 805. Indeed, the identity provider 210 can identify the user account corresponding to the private ID and identify, in the corresponding account data, a shipping address of the user 505 or receive a user designation of a preferred address. The identity provider 210 can then communicate the address information of the user 505 to the shipping service as relating to the corresponding shipment ID. The shipping service 805 can then, as in the previous example, apply the received address information to the shipment ID so as to ensure that a package 810 received from the web application entity 510 for delivery is forwarded to the associated address (while protecting the privacy of the user's identity and information from the web application or privacy broker, etc.). Additional example implementations are also possible, such as implementations where the identity provider 210 arranges procurement of the shipment and provides address information in connection with the procurement, such as shown in the example illustrated in FIG. 8C, allowing an anonymous package of the web application entity 210 to be identified, by its shipment ID, as destined for the address information provided by the identity provider 210 during procurement of the shipment, among other examples.

It should be generally appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. For instance, private ID generation, order of communications between privacy broker and identity provider and other entities, use of the private ID by the web applications and services, etc. can be provided according to alternative implementations not shown but utilizing the general principles illustrated and described herein. Other such implementations, features, and details, not explicitly illustrated, should be appreciated from the contents of this Specification.

Turning to FIGS. 9A-9H, simplified flowcharts 900a-h are shown illustrating example techniques involving example privacy brokers, such as those shown and described in the examples above. For instance, in the example of FIG. 9A, a request can be received 902, for instance, at a privacy broker, to broker authentication of an anonymous user at a particular online entity. The online entity can be a host of a website, service, content, web application, etc. (collectively web application) provided to clients over a network such as the Internet. An identity provider can be identified 904 for the anonymous user. For example, a user can communicate identification of the identity provider to the privacy broker directly, through the selected identity provider, or even through the online entity. The privacy broker can receive 906 confirmation that the selected identity provider authenticated the user and the privacy broker can use this confirmation as the basis for generating 908 a unique private ID for the user. In some instances, the private ID can be generated 908 jointly by the privacy broker and identity provider. For instance, each of the privacy broker and identity provider can provide an input, such as a secret value, to an algorithm used between the privacy broker and identity provider to generate 908 the private ID. In some instances, the secret values can identify the user and online entity and a joint hash algorithm can be used to generate the private ID from the respective identifiers of the user and online entity. The private ID can then be caused 910 to be communicated to the online entity for use by the online entity in anonymously identifying the user and, in some cases, authenticating the user at the online entity. For instance, the privacy broker can send the private ID to the user for the user to provide to the online entity. In other instances, the privacy broker can communicate the association of the user with the private ID to the online entity directly, among other examples.

Turning to the example of FIG. 9B, an identity provider can authenticate 920 a user to a user account managed by the identity provider. For instance, the authentication of the user at the identity provider can be in response to a request, by an anonymous online entity to have authentication of the user brokered by a privacy broker. The privacy broker can redirect the user to the identity provider for the user to be authenticated at the identity provider. The identity provider can confirm 922 the authentication of the user to the privacy broker and coordinate 924 with the privacy broker to generate a private ID for the user. The private ID can be unique within a system to the particular pairing of the user with the anonymous online entity and can be generated according to a joint hash algorithm, in some examples. User data of the account of the user can be provided 926, for instance, in response to a request for user information of the anonymous online entity communicated, for instance, in authentication data received from the user in connection with the user's interactions with the anonymous entity. User data provided by the identity provider can be associated or otherwise identified as belonging to the user by virtue of the generated private ID.

In the example of FIG. 9C, a generated private ID, such as a private ID generated in accordance with the examples of FIGS. 9A and/or 9B, can be used to assist an entity in sending an email to an anonymous user. An email brokering request can be received 930, for instance, by a privacy broker from the entity to assist in sending an email from the entity to an anonymous user. The email brokering request can include the identification of a particular private ID paired to the entity and the anonymous user. Address information of the email can be modified 932 to hide headers, addresses, etc. that might identify the entity to parties other than the user (who knows of the relationship and/or interactions with the entity). Further, an identity provider can be identifier 934 as associated with the anonymous user. The modified email data can then be forwarded 936 to the identified identity provider for delivery to the particular recipient. As shown in the example of FIG. 9D, an identity provider can receive 940 an email forwarded by the privacy broker and identify 942 a private ID associated with the forwarded email. The private ID, in some examples, can be incorporated in the address, headers, or other data of the forwarded email or can be identified as a tag or other data forwarded by the privacy broker with the email, among other examples. The identity provider can use the private ID to identify 944 a particular user, whose user information is managed, at least in part, by the identity provider. Included in this user information can be the preferred email address of the particular user. The identity provider can identify 946 the email address of the user defined in the user account and forward 948 the email on to the user at the identified email address.

Figures 9E, 9F:
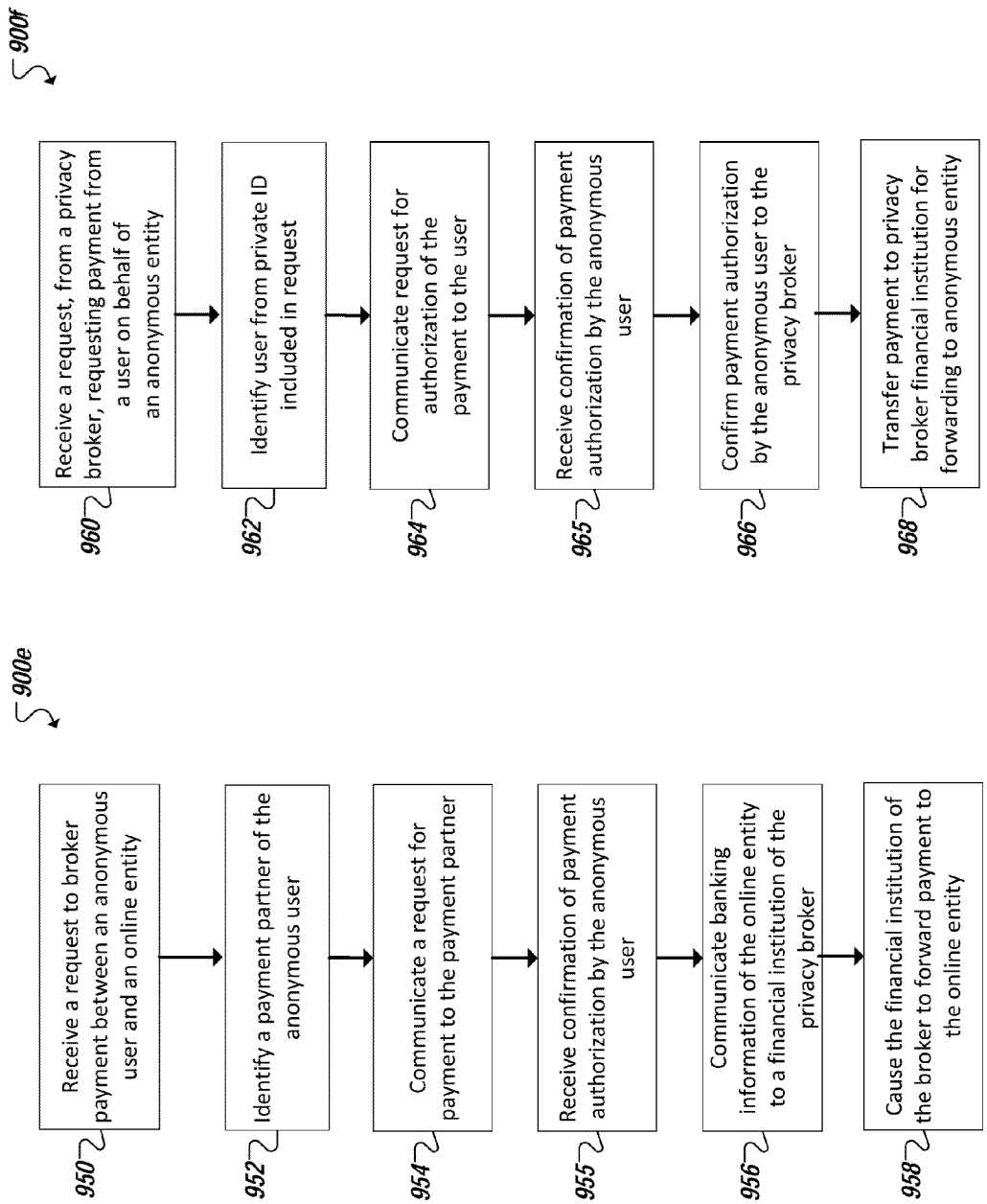

Turning to the examples of FIGS. 9E-9F, private IDs generated, for instance, using principles of the examples of FIGS. 9A and/or 9B, can be further used in the brokering of anonymous payments from a user to an entity, the private ID unique to the pairing of the user and entity (or another associated entity, website, etc.). In the example of FIG. 9E, a request to broker payment between an anonymous user and the entity can be received 950. The request can identify the amount of the payment, a private ID of the anonymous user, and bank account information of the entity (i.e., in which funds are to be deposited). A payment partner of the anonymous user can be identified 952. For example, the user can identify the payment partner to the entity in connection with a particular ecommerce transaction, such as, by indicating a method of payment. In other instances, an identity provider of the anonymous user can be queried for the preferred payment partner of the user. In either example, the requested payment can be communicated 954 to the payment partner. Upon receiving 955 confirmation that a user has verified and/or authorized the payment partner to remit funds from the user's accounts to satisfy the payment request and confirmation by the payment partner that the funds are really transferred, the privacy broker can communicate 956 banking information of the entity to the financial institution of the privacy broker, as the payment partner is to forward (958) the payment through the financial institution of the privacy broker so as to keep the identity and personal information of the user hidden from the entity. The privacy broker can receive confirmation (e.g., from the financial institution of the privacy broker and/or the entity) indicating that the payment was successful.

Turning to the example of FIG. 9F, a payment partner, in connection with an anonymous payment brokered by a privacy broker, can receive 960 a payment request of an anonymous entity, requesting a particular payment from a user anonymous to the anonymous entity. The request can include a private ID corresponding to the pairing of the anonymous entity and a particular user. The user can be identified 962 from the private ID, and the payment partner can contact (964) the user (or refer to auto-payment rules provided by the user) for authorization of the requested payment. If authorization is received (e.g., 965) or otherwise granted, the payment partner can confirm 966 the execution or guarantee of the payment (e.g., to the privacy broker) and transfer 968 funds to a financial institution of the privacy broker for use in forwarding funds ultimately to the bank account of the entity.

A generated private ID can be further used to broker anonymous shipping from an entity associated with the private ID to the user of the private ID. For instance, in the example of FIG. 9G, a request to broker shipment between an anonymous user and an entity can be received 970 from an entity by a privacy broker, the anonymous user identified in the request by the private ID (e.g., as the identity of the user is unknown to the entity and the privacy broker). A shipment ID can be obtained 972 by the privacy broker from a shipping provider on behalf of the requesting entity, the shipment ID corresponding to and identifying the shipment to be sent from the entity to the anonymous user/customer. In some instances, the privacy broker can purchase or otherwise procure the services of the shipping service in connection with obtaining 972 the shipment ID. The shipment ID can then be communicated 974 to the entity, for instance, for forwarding to the anonymous user (e.g., for use in tracking the shipment and/or communicating with the shipping service to provide additional information for the shipment, such as identity and address information of the user, among other examples). The shipment ID can be associated 976 with the private ID of the anonymous user, and communication of the shipment ID, monitoring of the shipment status, can be assisted by the association between the shipment ID and the private ID.

Figure 9H:
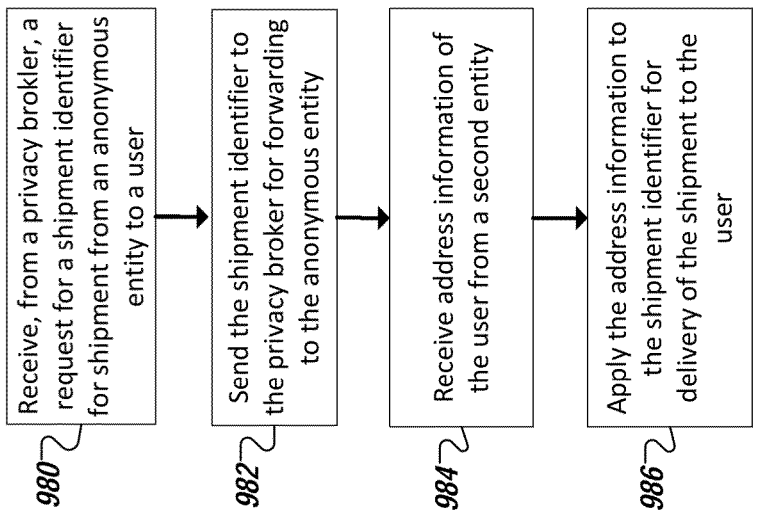

Turning to FIG. 9H, a shipping service system can cooperate and communicate with a privacy broker and other entities to assist in the brokering of an anonymous shipment from an anonymous entity to a particular user. A request for a shipment ID for the shipment can be received 980 and a shipment ID can be generated and sent 982 (e.g., through the privacy broker) to the anonymous entity. The shipment ID can be associated with a shipment for which no recipient information or address information has been received. Accordingly, address information of the user/recipient, can be received 984 from another entity, such as the user/recipient themselves, an identity provider storing the personal information of the user/recipient, etc. A private ID of the user/recipient can be used in connection with the identification of an identity provider, user account, address information, etc. The received address information can then be applied or associated 986 with the shipment identifier, such as in a database of the shipping service, so that by scanning or identifying the shipment ID (e.g., as found on a shipping label or elsewhere on the shipment itself), a corresponding address can be identified and used as the destination address of the shipment, among other examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Other systems and tools can also make use of principles of this disclosure. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
   receive, at a privacy broker, a brokered authentication request corresponding to an interaction between a first user and a first entity;
   identify, at the privacy broker, an identity provider corresponding to the first user, wherein the identity provider stores user data identifying the first user and at least a portion of the user data is to be hidden from the privacy broker and the first entity;
   receive confirmation, at the privacy broker, that the identity provider authenticated the first user to a user profile maintained by the identity provider and associated with the user data;
   generate, at the privacy broker, a unique persistent user identifier for the first user using a joint hash function, wherein inputs to the joint hash function comprise a first input from the privacy broker and a second input from the identity provider, the user identifier is unique, within a system, to a pairing of the first user with the first entity, the first input value is derived from a first secret value unknown to the identity provider and corresponding to the first entity, and the second input value is derived from a second secret value unknown to the privacy broker and corresponding to the portion of the user data; and
   cause the user identifier to be communicated to the first entity for authenticating the first user in interactions with the first entity, wherein the user identifier abstracts identity of the first user to the first entity, the first entity is to provide online resources to the first user based at least in part on the user identifier, and identity of the first entity to be interacted with in the interaction is invisible to the identity provider.

2. The storage medium of claim 1, wherein identity of the first user is unknown to the privacy broker.

3. The storage medium of claim 2, wherein the broker authentication request is received in response to a redirect of the first user from the first entity to the privacy broker.

4. The storage medium of claim 1, wherein the instructions, when executed, further cause the machine to receive a selection of the identity provider from the first user, wherein the identity provider is one of a plurality of identity providers available for selection by the user.

5. The storage medium of claim 1, wherein the identity provider is identified in a redirect of the first user from the first entity to the privacy broker.

6. The storage medium of claim 1, wherein the instructions, when executed, further cause the machine to send the first user a redirect to the identity provider based on the identification of the identity provider.

7. The storage medium of claim 1, wherein the brokered authentication request includes a request for user information of the first user, and the instructions, when executed, further cause the machine to:
cause the request for user information to be communicated to the identity provider, wherein user information returned by the identity provider in response to the request for user information masks identity of the first user and is communicated to the first entity.

8. The storage medium of claim 7, wherein the user information includes at least one of age information of the first user, location information of the first user, reputation information for the first user, and gender information of the first user.

9. The storage medium of claim 7, wherein the user information returned by the identity provider indicates whether a particular attribute of the first user satisfies a particular condition of the first entity for the particular attribute without identifying actual values of the particular attribute of the first user.

10. The storage medium of claim 1, wherein the first user is authenticated anonymously at the first entity.

11. The storage medium of claim 1, wherein the user identifier is generated jointly by the privacy broker and the identity provider.

12. The storage medium of claim 1, wherein the first secret value identifies the first entity and the second secret value identifies the first user.

13. The storage medium of claim 1, wherein each of the first input and second input are hashed values.

14. The storage medium of claim 13, wherein generating the user identifier includes:
exchanging the hashed first and second inputs;
generating a hash of the hashed first and second inputs.

15. The storage medium of claim 1, wherein the confirmation is received from the first user.

16. The storage medium of claim 1, wherein the confirmation is received from the identity provider.

17. The storage medium of claim 1, wherein the instructions, when executed, further cause the machine to receive feedback regarding the first entity from the first user, wherein the feedback references the user identifier.

18. The storage medium of claim 1, wherein the instructions, when executed, further cause the machine to:
receive feedback regarding the first user from the first entity; and
communicate the feedback to the identity provider, wherein the feedback is referenced to the user identifier.

19. The storage medium of claim 1, further comprising:
receive a brokered authentication request corresponding to an interaction between a second user and the first entity;
generate a second unique persistent user identifier for the second user, the second user identifier unique, within the system, to a pairing of the second user with the first entity; and
cause the second user identifier to be communicated to the first entity for authenticating the second user in interactions with the first entity.

20. The storage medium of claim 1, further comprising:
receive a brokered authentication request corresponding to an interaction between the first user and a second entity providing online resources;
generate a second unique persistent user identifier for the first user, the second user identifier unique, within the system, to a pairing of the first user with the second entity; and
cause the second unique persistent user identifier to be communicated to the second entity for authenticating the first user in interactions with the second entity.

21. A method comprising:
receiving, at a privacy broker, a brokered authentication request corresponding to an interaction between a first user and a first entity;
identifying, at the privacy broker, an identity provider corresponding to the first user, wherein the identity provider stores user data identifying the first user and at least a portion of the user data is to be privately stored at the identity provider;
receiving, at the privacy broker, confirmation that the identity provider authenticated the first user to a user profile maintained by the identity provider and associated with the user data;
generating, at the privacy broker, a unique persistent user identifier for the first user using a joint hash function, wherein inputs to the joint hash function comprise a first input from the privacy broker and a second input from the identity provider, the user identifier is unique, within a system, to a pairing of the first user with the first entity, the first input value is derived from a first secret value unknown to the identity provider and corresponding to the first entity, and the second input value is derived from a second secret value unknown to the privacy broker and corresponding to the portion of the user data; and
causing the user identifier to be communicated to the first entity for authenticating the first user in interactions with the first entity, wherein the user identifier abstracts identity of the first user to the first entity, the first entity is to provide online resources to the first user based at least in part on the user identifier, and identity of the first entity to be interacted with in the interaction is invisible to the identity provider.

22. A system comprising:
at least one processor device;
at least one memory element; and
a privacy broker, adapted when executed by the at least one processor device to:
receive a brokered authentication request corresponding to an interaction between a first user and a first entity;
identify an identity provider corresponding to the first user, wherein the identity provider stores user data identifying the first user and at least a portion of the user data is to be kept from the privacy broker and the first entity;
receive confirmation that the identity provider authenticated the first user to user profile maintained by the identity provider and associated with the user data;
generate a unique persistent user identifier for the first user using a joint hash function, wherein inputs to the joint hash function comprise a first input from the privacy broker and a second input from the identity provider, the user identifier is unique, within a system, to a pairing of the first user with the first entity, the first input value is derived from a first secret value unknown to the identity provider and corresponding to the first entity, and the second input value is derived from a second secret value unknown to the privacy broker and corresponding to the portion of the user data; and cause the user identifier to be communicated to the first entity for authenticating the first user in interactions with the first entity, wherein identity of the first entity to be interacted with in the interaction is invisible to the identity provider.

23. The system of claim 22, further comprising the identity provider, the identity provider adapted to:
maintain user information for a plurality of users including the first user;
cooperatively generate user identifiers for the plurality of users with the privacy broker; and
respond to requests for user information of the plurality of users by referencing the users by the respective user identifiers of the users.

24. The system of claim 22, wherein the privacy broker maintains host data corresponding to a plurality of online entities including the first entity, wherein identity of the entities is known to the privacy broker.

25. The system of claim 24, wherein identity of the first user is hidden from the privacy broker.

* * * * *

UNITED STATES PATENT AND TRADEMARK OFFICE
CERTIFICATE OF CORRECTION

Figure 9G:
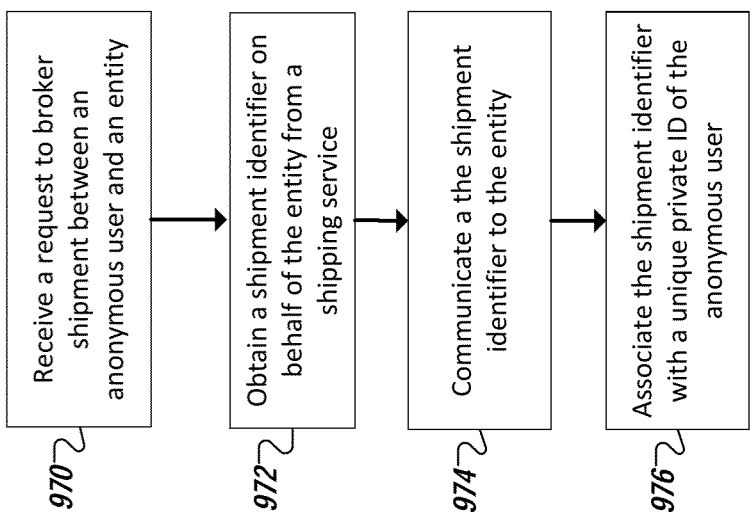

PATENT NO. : 9,268,933 B2  Page 1 of 1
APPLICATION NO. : 13/591497
DATED : February 23, 2016
INVENTOR(S) : Martin Stecher It is certified that error appears in the above-identified patent and that said Letters Patent is hereby corrected as shown below:

In the drawings:

On sheet 16 of 16, in Figure 9G, reference numeral 974, line 1, delete "a the" and insert -- the --, therefor.

Signed and Sealed this
Twenty-third Day of August, 2016

Michelle K. Lee
*Director of the United States Patent and Trademark Office*